United States Patent
Walker et al.

(10) Patent No.: US 7,865,265 B2
(45) Date of Patent: Jan. 4, 2011

(54) PRODUCTS AND PROCESSES FOR VENDING A PLURALITY OF PRODUCTS VIA DEFINED GROUPS

(75) Inventors: Jay S. Walker, Ridgefield, CT (US); Paul T. Breitenbach, Wilton, CT (US); Daniel E. Tedesco, Huntington, CT (US); Sih Y. Lee, Northvale, NJ (US); Paul D. Signorelli, New York, NY (US); Geoffrey M. Gelman, Boston, MA (US); James A. Jorasch, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 294 days.

(21) Appl. No.: 11/877,182

(22) Filed: Oct. 23, 2007

(65) Prior Publication Data

US 2008/0039972 A1     Feb. 14, 2008

Related U.S. Application Data

(60) Division of application No. 11/426,215, filed on Jun. 23, 2006, now abandoned, which is a continuation of application No. 10/902,347, filed on Jul. 29, 2004.

(60) Provisional application No. 60/491,215, filed on Jul. 30, 2003, provisional application No. 60/536,277, filed on Jan. 13, 2004, provisional application No. 60/560,960, filed on Apr. 9, 2004.

(51) Int. Cl.
    *G06F 17/00*     (2006.01)

(52) U.S. Cl. ..................... 700/240; 700/236

(58) Field of Classification Search ................. 700/236, 700/240
See application file for complete search history.

(56) References Cited

U.S. PATENT DOCUMENTS 2,607,463 A     8/1952     Saigh, Jr.

(Continued)

FOREIGN PATENT DOCUMENTS

CA     2070736 A1     6/1992

(Continued)

OTHER PUBLICATIONS

"VendMaster Windows and Vending Software News", Independent Vendors' Association Quarterly, (http://www.vendmaster.com/news_main.html), Apr./May/Jun. 1997, 10pp.

(Continued)

*Primary Examiner*—Gene Crawford
*Assistant Examiner*—Timothy R Waggoner
(74) *Attorney, Agent, or Firm*—Fincham Downs, LLC; Carson C. K. Fincham

(57) ABSTRACT

Products and processes are disclosed for defining at least one inventory group. This at least one inventory group includes at least two products that are available for sale by a vending machine. The vending machine outputs an indication of products that the at least one inventory group includes. The vending machine receiving, from a customer, a selection of a first product that the at least one inventory group includes. The vending machine processes a sale of a unit of the first product and a respective unit of at least one additional product for a single price.

17 Claims, 3 Drawing Sheets

U.S. PATENT DOCUMENTS

| | | | |
|---|---|---|---|
| 3,442,442 A | 5/1969 | Neidig | |
| 3,573,747 A | 4/1971 | Adams et al. | 340/172.5 |
| 3,609,250 A | 9/1971 | Morris | 179/100 |
| 3,688,276 A | 8/1972 | Quinn | |
| 3,691,527 A | 9/1972 | Yamamoto | |
| 3,705,384 A | 12/1972 | Wahlberg | 340/149 |
| 3,718,906 A | 2/1973 | Lightner | 340/147 |
| 3,747,733 A | 7/1973 | Knickerbocker | 194/10 |
| 3,937,929 A | 2/1976 | Knauer | |
| 3,947,882 A | 3/1976 | Lightner | 360/92 |
| 4,008,792 A | 2/1977 | Levasseur et al. | 794/1 N |
| RE29,450 E | 10/1977 | Goldsby et al. | 340/150 |
| 4,108,361 A | 8/1978 | Krause | 235/375 |
| 4,237,537 A | 12/1980 | Pitches et al. | 364/465 |
| 4,245,730 A | 1/1981 | Bachmann et al. | 194/1 A |
| 4,258,837 A | 3/1981 | Manos et al. | 194/1 N |
| 4,282,575 A | 8/1981 | Hoskinson et al. | 364/479 |
| 4,316,532 A | 2/1982 | Levasseur | 194/1 N |
| 4,323,770 A | 4/1982 | Dieulot et al. | 235/375 |
| 4,341,951 A | 7/1982 | Benton | |
| 4,359,147 A | 11/1982 | Levasseur | 194/1 N |
| 4,376,479 A | 3/1983 | Sugimoto et al. | 194/1 N |
| 4,412,292 A | 10/1983 | Sedam et al. | 364/479 |
| 4,417,671 A | 11/1983 | Kawasaki et al. | |
| 4,420,751 A | 12/1983 | Paganini et al. | 340/825.33 |
| 4,454,670 A | 6/1984 | Bachmann et al. | 40/584 |
| 4,478,353 A | 10/1984 | Levasseur | 221/14 |
| 4,494,197 A | 1/1985 | Troy et al. | 364/412 |
| 4,498,570 A | 2/1985 | King et al. | 194/1 N |
| 4,500,880 A | 2/1985 | Gomersall et al. | 340/825.35 |
| 4,518,098 A | 5/1985 | Fleischer | 221/15 |
| 4,551,935 A | 11/1985 | Bachman et al. | |
| 4,554,446 A | 11/1985 | Murphy et al. | |
| 4,567,609 A | 1/1986 | Metcalf | |
| 4,574,947 A | 3/1986 | Hutchings | 206/45.34 |
| RE32,115 E | 4/1986 | Lockwood et al. | |
| 4,587,984 A | 5/1986 | Levasseur et al. | 133/8 R |
| 4,593,361 A | 6/1986 | Otten | 364/479 |
| 4,598,378 A | 7/1986 | Giacomo | 364/479 |
| 4,603,390 A | 7/1986 | Mehdipour et al. | |
| 4,639,875 A | 1/1987 | Abraham et al. | 364/479 |
| 4,654,800 A | 3/1987 | Hayashi et al. | 364/479 |
| 4,669,730 A | 6/1987 | Small | 273/138 A |
| 4,677,553 A | 6/1987 | Roberts et al. | 364/412 |
| 4,679,150 A | 7/1987 | Hayashi et al. | 364/479 |
| 4,689,742 A | 8/1987 | Troy et al. | 364/412 |
| 4,723,212 A | 2/1988 | Mindrum et al. | 364/401 |
| 4,734,858 A | 3/1988 | Schlafly | |
| 4,736,096 A | 4/1988 | Ushikubo | 235/472 |
| 4,737,910 A | 4/1988 | Kimbrow | |
| 4,743,022 A | 5/1988 | Wood | |
| 4,760,247 A | 7/1988 | Keane et al. | 235/454 |
| 4,766,548 A | 8/1988 | Cedrone et al. | 364/479 |
| 4,799,156 A | 1/1989 | Shavit et al. | |
| 4,815,741 A | 3/1989 | Small | 273/138 A |
| 4,817,166 A | 3/1989 | Gonzalez et al. | |
| 4,817,990 A | 4/1989 | Krost | |
| 4,825,045 A | 4/1989 | Humble | 235/383 |
| 4,833,607 A | 5/1989 | Dethloff et al. | |
| 4,834,231 A | 5/1989 | Awane et al. | 194/217 |
| 4,839,507 A | 6/1989 | May | 235/381 |
| 4,854,590 A | 8/1989 | Jolliff et al. | 273/138 A |
| 4,857,840 A | 8/1989 | Lanchais | |
| 4,859,838 A | 8/1989 | Okiharu | 235/383 |
| 4,876,592 A | 10/1989 | Von Kohorn | |
| 4,878,248 A | 10/1989 | Shyu et al. | |
| 4,882,473 A | 11/1989 | Bergeron et al. | 235/380 |
| 4,882,675 A | 11/1989 | Nichtberger et al. | |
| 4,882,688 A | 11/1989 | Kondziolka et al. | |
| 4,899,906 A | 2/1990 | Bella | 221/67 |
| 4,902,880 A | 2/1990 | Garczynski et al. | |
| 4,906,828 A | 3/1990 | Halpern | 235/379 |
| 4,908,761 A | 3/1990 | Tai | 364/401 |
| 4,910,672 A | 3/1990 | Off et al. | 364/405 |
| 4,922,435 A | 5/1990 | Cahlander et al. | |
| 4,922,522 A | 5/1990 | Scanlon | 379/95 |
| 4,937,853 A | 6/1990 | Brule et al. | 379/96 |
| 4,947,028 A | 8/1990 | Gorog | |
| 4,949,256 A | 8/1990 | Humble | |
| 4,963,723 A | 10/1990 | Masada | |
| 4,973,952 A | 11/1990 | Malec et al. | 340/825.35 |
| 4,982,337 A | 1/1991 | Burr et al. | 364/479 |
| 4,982,346 A | 1/1991 | Giruard et al. | |
| 4,992,940 A | 2/1991 | Dworkin | |
| 4,993,714 A | 2/1991 | Golightly | 273/138 A |
| 4,999,763 A | 3/1991 | Ousborne | 364/140 |
| 5,007,518 A | 4/1991 | Crooks et al. | |
| 5,010,485 A | 4/1991 | Bigari | |
| 5,025,372 A | 6/1991 | Burton et al. | |
| 5,029,098 A | 7/1991 | Levasseur | 705/10 |
| 5,034,739 A | 7/1991 | Gruhl | |
| 5,036,472 A | 7/1991 | Buckley | |
| 5,039,848 A | 8/1991 | Stoken | |
| 5,056,019 A | 10/1991 | Schultz et al. | 364/405 |
| 5,058,044 A | 10/1991 | Stewart et al. | |
| 5,064,999 A | 11/1991 | Okamoto et al. | |
| 5,081,685 A | 1/1992 | Jones, III et al. | |
| 5,091,713 A | 2/1992 | Horne et al. | 340/541 |
| 5,117,354 A | 5/1992 | Long et al. | |
| 5,117,407 A | 5/1992 | Vogel | 369/30 |
| 5,119,295 A | 6/1992 | Kapur | 364/412 |
| 5,128,862 A | 7/1992 | Mueller | 364/405 |
| 5,132,914 A | 7/1992 | Cahlander et al. | 364/478 |
| 5,136,658 A | 8/1992 | Mori | |
| 5,172,328 A | 12/1992 | Cahlander et al. | 364/478 |
| 5,173,851 A | 12/1992 | Off et al. | 364/401 |
| 5,176,224 A | 1/1993 | Spector | |
| 5,177,342 A | 1/1993 | Adams | 235/379 |
| 5,185,695 A | 2/1993 | Pruchnicki | |
| 5,189,607 A | 2/1993 | Shirasaki et al. | |
| 5,191,410 A | 3/1993 | McCalley et al. | |
| 5,192,854 A | 3/1993 | Counts | 235/375 |
| 5,193,648 A | 3/1993 | Yuter | |
| 5,201,010 A | 4/1993 | Deaton et al. | 382/7 |
| 5,202,826 A | 4/1993 | McCarthy | |
| 5,204,675 A | 4/1993 | Sekine | |
| 5,216,595 A | 6/1993 | Protheroe | 364/412 |
| 5,223,698 A | 6/1993 | Kapur | 235/375 |
| 5,231,569 A | 7/1993 | Myatt et al. | 364/408 |
| 5,239,165 A | 8/1993 | Novak | 235/375 |
| 5,243,515 A | 9/1993 | Lee | 364/401 |
| 5,245,533 A | 9/1993 | Marshall | 364/401 |
| 5,253,165 A | 10/1993 | Leiseca et al. | |
| 5,256,863 A | 10/1993 | Ferguson et al. | |
| 5,257,179 A | 10/1993 | DeMar | 364/410 |
| 5,262,941 A | 11/1993 | Saladin et al. | 364/408 |
| 5,267,452 A | 12/1993 | Zinsmeyer et al. | 62/505 |
| 5,269,521 A | 12/1993 | Rossides | 705/14 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | 364/405 |
| 5,297,026 A | 3/1994 | Hoffman | |
| 5,297,031 A | 3/1994 | Gutterman et al. | 364/408 |
| 5,302,811 A | 4/1994 | Fukatsu | 235/381 |
| 5,305,195 A | 4/1994 | Murphy | |
| 5,309,355 A | 5/1994 | Lockwood | 364/401 |
| 5,315,093 A | 5/1994 | Stewart | |
| 5,315,664 A | 5/1994 | Kumagai | |
| 5,319,542 A | 6/1994 | King, Jr. et al. | |
| 5,325,291 A | 6/1994 | Garrett et al. | |
| 5,339,250 A | 8/1994 | Durbin | 364/479 |
| 5,353,218 A | 10/1994 | De Lapa et al. | 364/401 |
| 5,353,219 A | 10/1994 | Mueller et al. | 364/405 |
| 5,367,452 A | 11/1994 | Gallery et al. | 364/401 |

| | | | | | | |
|---|---|---|---|---|---|---|
| 5,368,129 A | 11/1994 | Von Kohorn ................. 186/52 | | 5,664,115 A | 9/1997 | Fraser |
| 5,371,796 A | 12/1994 | Avarne ........................ 380/23 | | 5,665,953 A | 9/1997 | Mazzamuto et al. |
| 5,380,991 A | 1/1995 | Valencia et al. ............. 235/383 | | 5,666,493 A | 9/1997 | Wojcik et al. |
| 5,381,155 A | 1/1995 | Gerber | | 5,675,662 A | 10/1997 | Deaton et al. |
| 5,383,111 A | 1/1995 | Homma et al. | | 5,685,435 A | 11/1997 | Picioccio et al. ............. 209/677 |
| RE34,915 E | 4/1995 | Nichtberger et al. ........ 364/401 | | 5,687,087 A | 11/1997 | Taggart ................. 364/479.03 |
| 5,408,417 A | 4/1995 | Wilder ........................ 364/479 | | 5,687,322 A | 11/1997 | Deaton et al. |
| 5,415,319 A | 5/1995 | Risolia | | 5,692,132 A | 11/1997 | Hogan |
| 5,420,606 A | 5/1995 | Begum et al. ................ 345/156 | | 5,701,252 A | 12/1997 | Facchin et al. ............... 364/479 |
| 5,422,473 A | 6/1995 | Kamata | | 5,708,782 A | 1/1998 | Larson et al. |
| 5,425,108 A | 6/1995 | Hwang et al. | | 5,710,557 A | 1/1998 | Schuette |
| 5,434,394 A | 7/1995 | Roach et al. ................. 235/375 | | 5,710,886 A | 1/1998 | Christiansen et al. |
| 5,440,336 A | 8/1995 | Buhro et al. .................. 348/13 | | 5,710,887 A | 1/1998 | Chelliah et al. |
| 5,445,295 A | 8/1995 | Brown | | 5,713,795 A | 2/1998 | Kohorn |
| 5,450,938 A | 9/1995 | Rademacher ............... 194/206 | | 5,717,866 A | 2/1998 | Naftger |
| 5,452,344 A | 9/1995 | Larson ........................ 379/107 | | 5,719,396 A | 2/1998 | Jack et al. |
| 5,459,306 A | 10/1995 | Stein et al. .................. 235/383 | | 5,721,827 A | 2/1998 | Logan et al. |
| 5,481,094 A | 1/1996 | Suda ........................... 235/383 | | 5,724,518 A | 3/1998 | Helbing |
| 5,482,139 A | 1/1996 | Rivalto | | 5,724,886 A | 3/1998 | Ewald et al. |
| 5,495,412 A | 2/1996 | Thiessen | | 5,726,450 A | 3/1998 | Peterson et al. |
| 5,504,475 A | 4/1996 | Houdou et al. ......... 340/825.35 | | 5,727,163 A | 3/1998 | Bezos |
| 5,504,675 A | 4/1996 | Cragun et al. ............... 364/401 | | 5,727,164 A | 3/1998 | Kaye et al. |
| 5,510,979 A | 4/1996 | Moderi et al. ............... 364/405 | | 5,732,398 A | 3/1998 | Tagawa ........................ 705/5 |
| 5,511,646 A | 4/1996 | Maldanis et al. ............ 194/217 | | 5,732,950 A | 3/1998 | Moody ...................... 273/292 |
| 5,513,117 A | 4/1996 | Small | | 5,734,150 A | 3/1998 | Brown et al. ................. 235/381 |
| 5,521,364 A | 5/1996 | Kimura et al. | | 5,734,838 A | 3/1998 | Robinson et al. |
| 5,526,257 A | 6/1996 | Lerner | | 5,737,710 A | 4/1998 | Anthonyson |
| 5,536,045 A | 7/1996 | Adams | | 5,739,512 A | 4/1998 | Tognazzini |
| 5,537,314 A | 7/1996 | Kanter | | 5,748,485 A | 5/1998 | Christiansen et al. ........ 700/234 |
| 5,539,189 A | 7/1996 | Wilson | | 5,754,653 A | 5/1998 | Canfield |
| 5,544,040 A | 8/1996 | Gerbaulet | | 5,758,328 A | 5/1998 | Giovannoli |
| 5,544,288 A | 8/1996 | Morgan | | 5,761,648 A | 6/1998 | Golden et al. |
| 5,544,784 A | 8/1996 | Malspina | | 5,768,142 A | 6/1998 | Jacobs ................... 364/479.01 |
| 5,546,316 A | 8/1996 | Buckley et al. ......... 364/479.03 | | 5,769,269 A | 6/1998 | Peters ............................ 221/7 |
| 5,550,746 A | 8/1996 | Jacobs ................... 364/479.01 | | 5,772,510 A | 6/1998 | Roberts |
| 5,557,721 A | 9/1996 | Fite et al. | | 5,774,868 A | 6/1998 | Cragun et al. .................. 705/10 |
| 5,564,546 A | 10/1996 | Molbak et al. ............... 196/216 | | 5,774,870 A | 6/1998 | Storey |
| 5,568,406 A | 10/1996 | Gerber | | 5,774,874 A | 6/1998 | Veeneman et al. |
| 5,572,653 A | 11/1996 | DeTemple et al. ........... 395/501 | | 5,780,133 A | 7/1998 | Engstrom ................. 428/40.1 |
| 5,581,064 A | 12/1996 | Riley et al. .................. 235/383 | | 5,791,991 A | 8/1998 | Small |
| 5,591,972 A | 1/1997 | Noble et al. | | 5,794,207 A | 8/1998 | Walker et al. |
| 5,592,375 A | 1/1997 | Salmon et al. ............... 395/207 | | 5,799,284 A | 8/1998 | Bourquin |
| 5,592,376 A | 1/1997 | Hodroff ....................... 395/214 | | 5,802,015 A | 9/1998 | Rothschild et al. ............. 368/10 |
| 5,592,378 A | 1/1997 | Cameron et al. ............. 395/214 | | 5,806,044 A | 9/1998 | Powell |
| 5,596,501 A | 1/1997 | Comer et al. .......... 364/464.23 | | 5,809,144 A | 9/1998 | Sirbu et al. |
| 5,602,377 A | 2/1997 | Beller et al. ................. 235/462 | | 5,816,918 A | 10/1998 | Kelley et al. |
| 5,604,901 A | 2/1997 | Kelley et al. | | 5,819,285 A | 10/1998 | Damico et al. ............... 707/104 |
| 5,608,643 A | 3/1997 | Wichter et al. .......... 364/479.14 | | 5,822,216 A | 10/1998 | Satchell, Jr. et al. ..... 364/479.01 |
| 5,611,051 A | 3/1997 | Pirelli | | 5,822,736 A | 10/1998 | Hartman et al. ................. 705/1 |
| 5,611,052 A | 3/1997 | Dykstra et al. ............... 395/238 | | 5,831,862 A | 11/1998 | Hetrick et al. ............... 700/232 |
| 5,612,527 A | 3/1997 | Ovadia | | 5,832,457 A | 11/1998 | O'Brien et al. |
| 5,612,868 A | 3/1997 | Off et al. ..................... 364/214 | | 5,832,458 A | 11/1998 | Jones |
| 5,613,620 A | 3/1997 | Center et al. ................. 221/133 | | 5,835,896 A | 11/1998 | Fisher et al. |
| 5,615,269 A | 3/1997 | Micali ........................... 380/49 | | 5,842,178 A | 11/1998 | Giovannoli |
| 5,619,558 A | 4/1997 | Jheeta | | 5,842,212 A | 11/1998 | Ballurio et al. |
| 5,620,079 A | 4/1997 | Molbak ....................... 194/217 | | 5,844,808 A | 12/1998 | Konsmo et al. .......... 364/479.14 |
| 5,621,201 A | 4/1997 | Langhans et al. ............ 235/380 | | 5,845,259 A | 12/1998 | West et al. |
| 5,621,640 A | 4/1997 | Burke .......................... 395/214 | | 5,845,265 A | 12/1998 | Woolston |
| 5,621,812 A | 4/1997 | Deaton et al. | | 5,848,399 A | 12/1998 | Burke |
| 5,630,357 A | 5/1997 | Akiyama ................... 99/323.6 | | 5,850,446 A | 12/1998 | Berger et al. |
| 5,631,724 A | 5/1997 | Sawada et al. | | 5,855,007 A | 12/1998 | Jovicic et al. |
| 5,632,010 A | 5/1997 | Briechle et al. ................. 345/1 | | 5,855,008 A | 12/1998 | Goldhaber et al. |
| 5,633,839 A | 5/1997 | Alexander et al. ............ 369/30 | | 5,857,175 A | 1/1999 | Day et al. |
| 5,637,859 A | 6/1997 | Menoud | | 5,860,362 A | 1/1999 | Smith |
| 5,638,302 A | 6/1997 | Gerber | | 5,864,604 A | 1/1999 | Moen et al. |
| 5,638,457 A | 6/1997 | Deaton et al. | | 5,864,822 A | 1/1999 | Baker, III |
| 5,638,985 A | 6/1997 | Fitzgerald | | RE36,116 E | 2/1999 | McCarthy |
| 5,642,484 A | 6/1997 | Harrison, III et al. | | 5,870,716 A | 2/1999 | Sugiyama et al. |
| 5,642,485 A | 6/1997 | Deaton et al. | | 5,870,717 A | 2/1999 | Wiecha |
| 5,649,114 A | 7/1997 | Deaton et al. | | 5,870,719 A | 2/1999 | Maritzen et al. |
| 5,651,075 A | 7/1997 | Frazier et al. | | 5,872,834 A | 2/1999 | Teitelbaum |
| 5,652,421 A | 7/1997 | Veeneman et al. | | 5,873,069 A | 2/1999 | Reuhl et al. ................... 705/20 |
| 5,655,007 A | 8/1997 | McAllister | | 5,875,110 A | 2/1999 | Jacobs ................... 364/479.02 |

| | | | | | | |
|---|---|---|---|---|---|---|
| 5,878,139 | A | 3/1999 | Rosen | 6,119,099 | A * | 9/2000 | Walker et al. ............... 705/16 |
| 5,878,400 | A | 3/1999 | Carter, III | 6,131,085 | A | 10/2000 | Rossides |
| 5,878,401 | A | 3/1999 | Joseph ............... 705/22 | 6,134,534 | A | 10/2000 | Walker et al. |
| 5,883,810 | A | 3/1999 | Franklin et al. | 6,167,327 | A | 12/2000 | Broker et al. .............. 700/238 |
| 5,887,271 | A | 3/1999 | Powell | 6,167,382 | A | 12/2000 | Sparks et al. |
| 5,890,136 | A | 3/1999 | Kipp | 6,170,631 | B1 | 1/2001 | Miyazaki |
| 5,890,718 | A | 4/1999 | Byon ............... 273/459 | 6,192,349 | B1 | 2/2001 | Husemann et al. |
| 5,905,246 | A | 5/1999 | Fajkowski | 6,193,154 | B1 | 2/2001 | Phillips et al. |
| 5,907,830 | A | 5/1999 | Engel et al. | 6,193,155 | B1 | 2/2001 | Walker et al. |
| 5,918,211 | A | 6/1999 | Sloane | 6,205,435 | B1 | 3/2001 | Biffar |
| 5,918,213 | A | 6/1999 | Bernard et al. ............... 705/26 | 6,223,163 | B1 | 4/2001 | Van Luchene ............... 705/1 |
| 5,923,016 | A | 7/1999 | Fredregill et al. | 6,236,971 | B1 | 5/2001 | Stefik et al. |
| 5,924,078 | A | 7/1999 | Naftzger | 6,243,691 | B1 | 6/2001 | Fisher et al. |
| 5,924,080 | A | 7/1999 | Johnson | 6,247,047 | B1 | 6/2001 | Wolff |
| 5,924,082 | A | 7/1999 | Silverman et al. | 6,249,772 | B1 | 6/2001 | Walker et al. |
| 5,927,541 | A | 7/1999 | Stoken et al. | 6,253,069 | B1 | 6/2001 | Mankovitz ............... 455/186.1 |
| 5,930,145 | A | 7/1999 | Yuyama et al. ....... 364/479.01 | 6,260,024 | B1 | 7/2001 | Shkedy |
| 5,930,771 | A | 7/1999 | Stapp ............... 705/28 | 6,266,651 | B1 | 7/2001 | Woolston |
| 5,937,391 | A | 8/1999 | Ikeda et al. | 6,321,984 | B1 | 11/2001 | McCall et al. |
| 5,938,717 | A | 8/1999 | Dunne et al. | 6,324,520 | B1 | 11/2001 | Walker et al. ............... 705/16 |
| 5,947,328 | A | 9/1999 | Kovens et al. ............... 221/129 | 6,330,490 | B1 | 12/2001 | Kim ............... 700/234 |
| 5,948,038 | A | 9/1999 | Daly et al. | 6,330,544 | B1 | 12/2001 | Walker et al. |
| 5,949,688 | A | 9/1999 | Montoya et al. ............ 700/235 | 6,341,314 | B1 | 1/2002 | Doganata et al. ............ 709/229 |
| 5,956,695 | A | 9/1999 | Carrithers et al. | 6,370,513 | B1 | 4/2002 | Kolawa et al. |
| 5,959,869 | A | 9/1999 | Miller et al. ............ 364/479.01 | 6,397,193 | B1 * | 5/2002 | Walker et al. ............... 705/16 |
| 5,959,945 | A | 9/1999 | Kleiman ............... 369/30 | 6,405,174 | B1 | 6/2002 | Walker et al. |
| 5,963,452 | A | 10/1999 | Etoh et al. ............ 364/479.06 | 6,449,658 | B1 | 9/2002 | Lafe et al. ............... 709/247 |
| 5,963,939 | A | 10/1999 | McCann et al. | 6,466,830 | B1 | 10/2002 | Manross et al. ............... 700/83 |
| 5,964,660 | A | 10/1999 | James et al. | 6,467,686 | B1 | 10/2002 | Guthrie et al. |
| 5,970,469 | A | 10/1999 | Scroggie et al. | 6,512,570 | B2 | 1/2003 | Garfinkle et al. |
| 5,974,399 | A | 10/1999 | Giuliani et al. | 6,553,346 | B1 | 4/2003 | Walker et al. |
| 5,988,346 | A | 11/1999 | Tedesco et al. ............... 194/217 | 6,571,150 | B2 | 5/2003 | Arai et al. ............... 700/236 |
| 5,991,740 | A | 11/1999 | Messer | 6,584,448 | B1 | 6/2003 | Laor |
| 5,995,942 | A | 11/1999 | Smith et al. | 6,587,031 | B1 | 7/2003 | Daugherty et al. ........ 340/5.31 |
| 5,997,236 | A | 12/1999 | Picioccio et al. ............ 414/403 | 6,587,835 | B1 | 7/2003 | Treyz et al. |
| 5,997,928 | A | 12/1999 | Kaish et al. ............... 426/418 | 6,594,646 | B1 | 7/2003 | Okayama et al. |
| 5,999,914 | A | 12/1999 | Blinn et al. | 6,615,241 | B1 | 9/2003 | Miller et al. ............... 709/206 |
| 6,009,412 | A | 12/1999 | Storey | 6,636,733 | B1 | 10/2003 | Helferich ............... 455/412 |
| 6,012,834 | A | 1/2000 | Dueck et al. ............ 364/479.08 | 6,644,547 | B1 | 11/2003 | White |
| 6,012,890 | A | 1/2000 | Celorio Garrido ........... 369/30 | 6,684,195 | B1 | 1/2004 | Deaton et al. |
| 6,014,634 | A | 1/2000 | Scroggie et al. | 6,708,203 | B1 | 3/2004 | Makar et al. ............... 709/206 |
| 6,016,504 | A | 1/2000 | Arnold et al. | 6,748,296 | B2 | 6/2004 | Banerjee et al. |
| 6,017,157 | A | 1/2000 | Garfinkle | 6,754,636 | B1 | 6/2004 | Walker et al. |
| 6,018,718 | A | 1/2000 | Walker et al. | 6,874,612 | B1 | 4/2005 | Uland ............... 700/236 |
| 6,021,394 | A | 2/2000 | Takahashi ............... 705/10 | 6,957,125 | B1 * | 10/2005 | Rifkin ............... 700/232 |
| 6,026,370 | A | 2/2000 | Jermyn | 6,970,837 | B1 | 11/2005 | Walker et al. |
| 6,026,375 | A | 2/2000 | Hall et al. | 6,980,887 | B2 | 12/2005 | Varga et al. ............... 700/236 |
| 6,029,139 | A | 2/2000 | Cunningham et al. | 7,014,108 | B2 | 3/2006 | Sorenson et al. |
| 6,029,141 | A | 2/2000 | Bezos et al. | 7,058,581 | B1 | 6/2006 | Young |
| 6,035,284 | A | 3/2000 | Straub et al. | 7,084,737 | B1 | 8/2006 | Moore et al. ............... 340/5.91 |
| 6,038,551 | A | 3/2000 | Barlow et al. | 7,216,089 | B1 | 5/2007 | Ota et al. ............... 705/14 |
| 6,048,267 | A | 4/2000 | Wichinsky ............... 463/13 | 7,218,991 | B2 | 5/2007 | Walker et al. |
| 6,049,777 | A | 4/2000 | Sheena et al. ............... 705/10 | 7,225,142 | B1 | 5/2007 | Apte et al. |
| 6,050,387 | A | 4/2000 | Iwaki ............... 194/207 | 7,236,946 | B2 | 6/2007 | Bates et al. ............... 706/26 |
| 6,050,568 | A | 4/2000 | Hachquet ............... 273/292 | 7,357,314 | B2 | 4/2008 | Kusakawa ............... 235/381 |
| 6,052,667 | A | 4/2000 | Walker et al. ............... 705/15 | 7,499,769 | B2 | 3/2009 | Walker et al. |
| 6,055,513 | A | 4/2000 | Katz | 2002/0077724 | A1 | 6/2002 | Paulucci et al. ............... 700/231 |
| 6,056,194 | A | 5/2000 | Kolls ............... 235/381 | 2002/0099604 | A1 | 7/2002 | Lewis et al. ............... 705/14 |
| 6,058,373 | A | 5/2000 | Blinn et al. | 2002/0107610 | A1 | 8/2002 | Kaehler et al. ............... 700/232 |
| 6,058,375 | A | 5/2000 | Park | 2002/0111157 | A1 | 8/2002 | Stieber et al. |
| 6,059,142 | A * | 5/2000 | Wittern et al. ............... 700/238 | 2002/0120496 | A1 | 8/2002 | Scroggie et al. |
| 6,061,660 | A | 5/2000 | Eggleston et al. | 2003/0033292 | A1 | 2/2003 | Meisel et al. |
| 6,067,570 | A | 5/2000 | Kreynin et al. ............... 709/27 | 2003/0040838 | A1 | 2/2003 | Lagunzad et al. |
| 6,073,840 | A | 6/2000 | Marion | 2003/0088465 | A1 | 5/2003 | Monteverde |
| 6,075,214 | A | 6/2000 | Sato et al. ............... 194/217 | 2003/0139969 | A1 | 7/2003 | Scroggie et al. |
| 6,076,070 | A | 6/2000 | Stack | 2004/0162633 | A1 | 8/2004 | Kraft et al. ............... 700/234 |
| 6,078,866 | A | 6/2000 | Buck et al. | 2004/0243478 | A1 | 12/2004 | Walker et al. |
| 6,085,168 | A | 7/2000 | Mori et al. | 2005/0060062 | A1 | 3/2005 | Walker et al. |
| 6,085,169 | A | 7/2000 | Walker et al. | 2005/0165806 | A1 | 7/2005 | Roatis et al. |
| 6,086,380 | A | 7/2000 | Chu et al. ............... 434/307 | 2006/0122885 | A1 | 6/2006 | Ota et al. |
| 6,098,879 | A | 8/2000 | Terranova ............... 235/384 | | | | |
| 6,101,485 | A | 8/2000 | Fortenberry et al. | | | | |
| 6,115,649 | A | 9/2000 | Sakata ............... 700/241 | | | | |

| | | |
|---|---|---|
| 2008/0051934 A1 | 2/2008 | Tedesco et al. ............... 700/236 |

FOREIGN PATENT DOCUMENTS

| | | |
|---|---|---|
| CA | 2217739 | 4/1996 |
| EP | 0 085 546 | 8/1983 |
| EP | 0 512 509 A2 | 11/1992 |
| EP | 512413 | 11/1992 |
| EP | 0 779 587 A2 | 9/1996 |
| EP | 0 779 587 A3 | 9/1996 |
| EP | 0 817 138 A1 | 1/1998 |
| EP | 0 856 812 A2 | 5/1998 |
| EP | 0 862 150 A2 | 9/1998 |
| GB | 2 109 305 A | 6/1983 |
| GB | 2 265 032 A | 9/1993 |
| GB | 2 317 257 A | 3/1998 |
| JP | 58-132886 | 8/1983 |
| JP | 58132886 A | 8/1983 |
| JP | 2001093 A | 1/1990 |
| JP | 2208798 A | 8/1990 |
| JP | 4235700 A | 8/1992 |
| JP | 5242363 A | 9/1993 |
| JP | 6035946 | 2/1994 |
| JP | 7065218 A | 3/1995 |
| JP | 7078274 | 3/1995 |
| JP | 07098779 A | 4/1995 |
| JP | 95139380 | 6/1995 |
| JP | 95162556 | 6/1995 |
| JP | 07249176 | 9/1995 |
| JP | 7272012 | 10/1995 |
| JP | 8030848 A | 2/1996 |
| JP | 08137951 | 5/1996 |
| JP | 8-147545 | 6/1996 |
| JP | 8221484 | 8/1996 |
| JP | 8221645 A | 8/1996 |
| JP | 8329323 A | 12/1996 |
| JP | 09016836 A | 1/1997 |
| JP | 9062908 A | 3/1997 |
| JP | 9097288 | 4/1997 |
| JP | 9190479 A | 7/1997 |
| JP | H9-198554 | 7/1997 |
| JP | 10187820 | 7/1998 |
| JP | 10214284 | 8/1998 |
| JP | 10240830 | 9/1998 |
| JP | 10269049 | 10/1998 |
| JP | 10289372 | 10/1998 |
| JP | 10289372 A | 10/1998 |
| JP | 11088560 | 3/1999 |
| JP | 2003150769 | 5/2003 |
| KR | 9503826 B | 4/1995 |
| WO | WO 95/27242 | 10/1995 |
| WO | WO 96/32701 | 10/1996 |
| WO | WO 97/16797 | 5/1997 |
| WO | WO 97/08638 A1 | 6/1997 |
| WO | WO 97/20279 | 6/1997 |
| WO | WO 97/21200 | 6/1997 |
| WO | WO 97/23838 | 7/1997 |
| WO | WO 97/24701 | 7/1997 |
| WO | WO 97/25684 | 7/1997 |
| WO | WO 97/28510 | 8/1997 |
| WO | WO 97/35441 | 9/1997 |
| WO | WO 97/44749 | 11/1997 |
| WO | WO 97/50064 | 12/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/28699 | 7/1998 |
| WO | WO 98/48388 | 10/1998 |
| WO | WO 98/48563 | 10/1998 |
| WO | WO 98/49658 | 11/1998 |
| WO | WO 98/58355 | 12/1998 |
| WO | WO 99/04326 | 1/1999 |
| WO | WO 99/07121 | 2/1999 |
| WO | WO 99/09508 | 2/1999 |
| WO | WO 99/38125 A1 | 7/1999 |
| WO | WO 99/12117 | 11/1999 |
| WO | WO 99/12117 A1 | 11/1999 |

OTHER PUBLICATIONS

Stigler, George J., "The Theory of Price", The Macmillan Company, 3rd Edition, Copyright 1966, pp. 82-94, 208-215, 8pp.

PCT Written Opinion for Application No. PCT/US98/05787, dated Jul. 29, 1999, 5pp.

PCT International Search Report for Application No. PCT/US98/05787, dated May 12, 1999, 5pp.

Office Action for U.S. Appl. No. 08/822,709, dated Jun. 23, 1999, 5pp.

Office Action for U.S. Appl. No. 08/822,709, dated Oct. 8, 1999, 2pp.

Office Action for U.S. Appl. No. 08/822,709, dated Feb. 17, 2000, 6pp.

Notice of Allowability for U.S. Appl. No. 08/822,709, dated Jan. 16, 2001, 2pp.

Office Action for U.S. Appl. No. 08/920,116, dated Oct. 1, 1999, 7pp.

Notice of Allowability for U.S. Appl. No. 08/920,116, dated Oct. 25, 1999, 5pp.

Interview Summary for U.S. Appl. No. 08/920,116, dated Oct. 25, 1999, 1pg.

Office Action for U.S. Appl. No. 08/947,798, dated Oct. 26, 2000, 4pp.

Office Action for U.S. Appl. No. 08/947,798, dated Jan. 20, 2000, 17pp.

Office Action for U.S. Appl. No. 08/947,798, dated May 8, 2001, 23pp.

Office Action for U.S. Appl. No. 08/947,798, dated Aug. 16, 2001, 4pp.

Interview Summary for U.S. Appl. No. 08/947,798, dated Aug. 16, 2001, 2pp.

Office Action for U.S. Appl. No. 08/947,798, dated Dec. 12, 2002, 7pp.

Office Action for U.S. Appl. No. 08/947,798, dated Jul. 5, 2002, 19pp.

Office Action for U.S. Appl. No. 08/947,798, dated Feb. 25, 2003, 12pp.

Office Action for U.S. Appl. No. 08/947,798, dated May 20, 2004, 16pp.

Office Action for U.S. Appl. No. 08/947,798, dated Jan. 12, 2005, 15pp.

Office Action for U.S. Appl. No. 08/947,798, dated Mar. 9, 2006, 15pp.

Office Action for U.S. Appl. No. 08/947,798, dated Aug. 24, 2006, 10pp.

Office Action for U.S. Appl. No. 08/947,798, dated Dec. 18, 2006, 21pp.

Office Action for U.S. Appl. No. 08/974,798, dated Sep. 20, 2007, 7pp.

Office Action for U.S. Appl. No. 08/974,798, dated Jan. 11, 2008, 6pp.

Office Action for U.S. Appl. No. 09/012,163, dated Sep. 29, 1999, 21pp.

Office Action for U.S. Appl. No. 09/012,163, dated Feb. 29, 2000, 7pp.

Office Action for U.S. Appl. No. 09/012,163, dated Jul. 6, 2000, 22pp.

Office Action for U.S. Appl. No. 09/012,163, dated Jan. 10, 2001, 13pp.

Notice of Allowability for U.S. Appl. No. 09/012,163, dated Jul. 27, 2001, 4pp.

Notice of Allowability for U.S. Appl. No. 09/012,163, dated Dec. 3, 2001, 4pp.

PCT International Search Report for Application No. PCT/US99/25484, dated Mar. 8, 2000, 3pp.

Office Action for U.S. Appl. No. 11/456,342, dated Sep. 14, 2007, 6pp.

Office Action for U.S. Appl. No. 09/345,092, dated Jan. 24, 2002, 37pp.
Office Action for U.S. Appl. No. 09/345,092, dated Mar. 20, 2001, 33pp.
Office Action for U.S. Appl. No. 09/345,092, dated Oct. 22, 2002, 42pp.
Office Action for U.S. Appl. No. 09/345,092, dated Jul. 1, 2005, 17pp.
Office Action for U.S. Appl. No. 09/345,092, dated Mar. 10, 2006, 8pp.
Office Action for U.S. Appl. No. 09/345,092, dated Aug. 29, 2006, 12pp.
Notice of Allowability for U.S. Appl. No. 09/345,092, dated Sep. 29, 2006, 4pp.
Notice of Allowability for U.S. Appl. No. 09/345,092, dated Mar. 1, 2007, 4pp.
Office Action for U.S. Appl. No. 09/345,092, dated Jun. 15, 2007, 2pp.
PCT International Search Report for Application No. PCT/US04/33811, dated Dec. 13, 2005, 1pg.
Written Opinion for Application No. PCT/US04/33811, dated Dec. 13, 2005, 3pp.
Office Action for U.S. Appl. No. 09/218,085, dated Aug. 18, 2006, 4pp.
Office Action for U.S. Appl. No. 09/218,085, dated Aug. 31, 2007, 2pp.
Office Action for U.S. Appl. No. 09/218,085, dated Dec. 11, 2007, 4pp.
Office Action for U.S. Appl. No. 10/095,372, dated Mar. 4, 2005, 8pp.
Notice of Allowability for U.S. Appl. No. 10/095,372, dated Feb. 17, 2007, 15pp.
Office Action for U.S. Appl. No. 11/426,328, dated Jan. 26, 2007, 5pp.
Office Action for U.S. Appl. No. 11/426,328, dated May 3, 2007, 4pp.
Notice of Allowability for U.S. Appl. No. 11/426,332, dated Nov. 6, 2007, 1pg.
Office Action for U.S. Appl. No. 11/426,332, dated Jan. 12, 2007, 5pp.
Office Action for U.S. Appl. No. 11/426,336, dated Oct. 6, 2006, 5pp.
Office Action for U.S. Appl. No. 11/426,336, dated Jan. 26, 2007, 5pp.
Office Action for U.S. Appl. No. 11/426,336, dated May 3, 2007, 5pp.
Office Action for U.S. Appl. No. 09/713,001, dated Aug. 8, 2002, 19pp.
Office Action for U.S. Appl. No. 09/713,001, dated Mar. 24, 2003, 2pp.
Office Action for U.S. Appl. No. 09/713,001, dated Dec. 1, 2003, 6pp.
Office Action for U.S. Appl. No. 09/713,001, dated Jul. 12, 2004, 8pp.
Office Action for U.S. Appl. No. 11/426,204, dated Oct. 1, 2007, 5pp.
Office Action for U.S. Appl. No. 11/426,204, dated Feb. 4, 2008, 4pp.
Office Action for U.S. Appl. No. 11/426,215, dated May 4, 2007, 4pp.
Office Action for U.S. Appl. No. 11/426,186, dated May 5, 2008, 9pp.
"SaveSmart—How SaveSmart Works for Consumers"; (http://savesmart.com/consumer/consumer-howitworks.html), Copyright 1998, 7pp.
"Welcome to Planet U, providers of U-pons—Internet Coupons—Internet Coupons"; (http://www.webcertificate.com:443/webcert/faq-detail.asp), Copyright 1998, 8pp.
Webcertificate, the perfect gift-giving solution . . . It's quick! It's Easy! It's Secure!; (http://www.webcertificate.com:443/webcert/faq-detial.asp), Copyright 1998, 14pp.
Shop the Marketplace, 1-800-flowers.com; (http://www.1800flowers.com/flowers/welcome.asp), Copyright 1998, 4pp.
"The Leader in Internet Shopping Systems for Supermarkets and Drug Stores", groceries online. copyright 1996 Groceries Online, Inc. (http://www.groceries-online.com/), Copyright 1996, 4pp.
"Brother Industries is pushing ahead with its new PC software . . . ", IDC Japan Report, Aug. 30, 1991, Section: vol. 17, p. 53, 1pg.
Maras, Elliot, "1995: downsizing adds costs; new strategies sought", Automatic Merchandiser, Aug. 1996, pp. 20-22, 24, 26, 28, 30, 32, 34, 36, 38, 40 and 44 (13pp.).

Naik, Gautam, "In Digital Dorm, Click on Return for Soda", The Wall Street Journal, Jan. 23, 1997, Section: Online, p. B1, 3pp.
Shea, Barbara, "Read Fine Print When Comparing Car Rentals", Feb. 9, 1997, St. Louis Post-Dispatch, Section: Travel & Leisure, p. 04T, 2pp.
Website: "CSH Drink Machine(s)", (http //www csh rit edu/proj/drink html), download date: Jan. 29, 1998, 2pp.
Desjardins, Doug, "Hollywood's Investment in Online Video Retailer Gets Mixed Reviews", Video Store, Aug. 9, 1998, Section: p. 1, ISSN: 0195-1750, 3pp.
Stigler, George J., "The Theory of Price", The Macmillan Company, Copyright 1952, pp. 82-94, 214-221 (14pp.).
Bowman, Jr., Ward S., "Tying Arrangements and the Leverage Problem", The Yale Law Journal, Nov. 1957, vol. 67, No. 1, pp. 19-36 (10pp.).
Narasimhan, Chakravarthi, "A Price Discrimination Theory of Coupons", Marketing Science, Spring 1984, vol. 3, No. 2, pp. 128-147 (20pp.).
Judith Evans, "Who was that masked Cybershopper?; MasterCard-Visa Agreement on Credit Card security may make On-Line commerce fly", The Washington Post, View Related Topics; Feb. 2, 1996, Final Edition; Section: Financial; p. F01, 2pp.
"First Virtual Holdings Releases Beta Software for Secure Transactions on Microsoft Merchant Server", PR Newswire, Mar. 31, 1997; Section: Financial News, 2pp.
"Six vendors sign on for early electronic commerce venture", Phillips Business Informaion, Inc. Voice Technology News, Dec. 13, 1994; No. 25, vol. 6; ISSN: 1045-1498, 2pp.
"The easy, pain-free way to buy or lease your next car", What is autoseek; (http://www.autoseek.com/#what) download date: May 28, 1997, 4pp.
Nora Lockwood Tooher, "Macy's new gift card gets trial run in Warwick", The Providence Journal-Bulletin; Oct. 1, 1998; Section: Business; p. 1E, 2pp.
Denise Caruso, "Digital Commerce; The boom in on-line shopping adds a twist to the old quandary of how to tax interstate purchases", The New York Times, View Related Topics, Dec. 28, 1998; Late Edition—Final; Section: C; p. 3; col. 5; Business/Financial Desk, 3pp.
Godwin, Nadine, "New software was key lure in $17 million agency buyout.", Travel Weekly, Nov. 26, 1984, Section: vol. 43, p. 45, ISSN: 0041-2082, 4pp.
"Woodside Management Systems Inc. today announced . . . ", PR Newswire, Apr. 1, 1986, 2pp.
Tellis, Gerard J., "Beyond the Many Faces of Price: An Integration of Pricing Strategies", Journal of Marketing, Oct. 1986, vol. 50, pp. 146-160, 15pp.
Godwin, Nadine, "Agency, funded by 3M, set to market software; Travelmation touts trip planner to corporations; designed to eliminate client-agent telephone calls; Business Travel Update", Travel Weekly, Oct. 13, 1986, Section: vol. 45, p. 45, ISSN: 0041-2082, 4pp.
Godwin, Nadine, "Agency dares to launch its own air res system; Travelmation system provides greater versatility, Automation Report", Travel Weekly, Oct. 23, 1986, 5pp.
"Thomas Cook Travel U.S.A. has announced . . . ", PR Newswire, Jan. 12, 1987, 2pp.
Bawa, Kapil et al., "The Coupon-Prone Consumer: some Findings Based on Purchase Behavior Across Product Classes", Journal of Marketing, Oct. 1987, vol. 51, pp. 99-110, 12pp.
Nomani Sr., A., "Air Crashes Stir Signs of Anxiety in Travelers", Wall Street Journal, Aug. 1, 1989, Section 2, p. 1, col. 1, 2pp.
Carlsen, Clifford, "From Airline Tickets to Human Organs, the Electronic Markets are Booming", San Francisco Business Times, Aug. 14, 1989, Section: vol. 3, No. 50, Section 1, p. 17, 2pp.
Golden, Fran, "AAL's Riga doubts Marketel's appeal to retailers", Travel Weekly, Nov. 13, 1989, Section: vol. 48, No. 91, p. 4, ISSN: 0041-2082, 2pp.
"Letters to BusinessExtra", The San Francisco Chronicle, Dec. 26, 1989, Section: Business, C7, 3pp.
Wallace, David, "Company Planning to Let Flyers bid on Airfares", Philadelphia Business Journal, Mar. 26, 1990, Section: vol. 9, No. 3, Section 1, p. 15, 3pp.

Greenberg, Peter S., "The Savvy Traveler: Lower Air Fares for Consumers Not in the Cards . . . " Los Angeles Times, Jul. 8, 1990, Section: Travel, Part L, p. 2, col. 1, Travel Peak, 2pp.

Carey, Christopher, "Firm Offers Auction for Airline Tickets", St. Louis Post-Dispatch, Aug. 7, 1991, Section: Business, p. 1B, 2pp.

Upton, Kim, "News and Briefs: French Say Monoliths Off-Limits to Visitors", Los Angeles Times, Aug. 25, 1991, Section: Travel, Part L, p. 4, col. 1, Travel Desk, 2pp.

"Buy Low, Fly High", USA Today, Nov. 14, 1991, Section: Bonus, p. 15, 2pp.

Feldman, Joan M., "To rein in those CRSs; computer reservation systems" Air Transport World, Dec. 1991, Section: vol. 28, No. 12, p. 89, ISSN: 0002-2543, 5pp.

"Traveler's Notes; Bookit Report", Consumers Reports Travel Letter, Dec. 1991, Section: vol. 7, No. 12, p. 143, 1pg.

"CRTL's Blue Ribbon Deals for 1992", Consumer Reports Travel Letter, Jan. 1992, Section: vol. 8, No. 1, pp. 3-5, 2pp.

"Newsletters", The Atlanta Journal and Constitution, Mar. 1, 1992, Section: Travel: Section K, p. 13, 1pg.

Del Rosso, Laura, "Ticket-bidding firm closes its doors, Marketel International", Travel Weekly, Mar. 12, 1992, Section: vol. 51, No. 21, p. 1, ISSN: 0041-2082, 2pp.

Hainer, Cathy et al., "Where vacationing kids get good care", USA Today, Apr. 1, 1992, Section: Life, p. 4D, 2pp.

Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14pp.

Spencer, Milton H. and Amos, Jr., Orley M., "Contemporary Economics, Eight Edition", Worth Publishers, Copyright 1993, 5pp.

Rajendran, K.N. And Tellis, Gerard J., "Contextual and Temporal Components of Reference Price", Journal of Marketing, Jan. 1994, pp. 22-34 (13pp.).

Feldman, Joan M., "Reclaiming control; new software to close gap between projected and actual revenues", Aug. 1995, Section: vol. 32, No. 8, p. 35, ISSN: 0002-2543, 5pp.

*United Sates* v. *Eastman Kodak Co.*, United States Court of Appeals for the Second Circuit, Docket No. 97/6190, decided Aug. 4, 1995, 16pp.

Bronnenberg, Bart J., "Limited Choice Sets, Local Price Response, and Implied Measures of Price Competition", Journal of Marketing Research, Spring 1996, Section: vol. XXXIII, p. 163, 20pp.

Prentice, Michael, "Searching for the lowest fare: Getting the lowest fare takes work, but it's worth the effort", The Ottawa Citizen, Oct. 9, 1996, Section: Citylife; Consuming Passion, p. C3, 3pp.

"Auctioning unsold airline tickets", Insight (USA), download date: Oct. 29, 1996, 1pg.

"Web Ventures presents Bookit!", (http www webventures com/bookit), Copyright 1996, 1pg.

"Salomon Brother's Maldutis Says Internet is Aviation's 'Third Revolution;' Will Earn Billions", World Airline News, Mar. 21, 1997, Section: vol. 7, No. 12, 2pp.

Feldman, Joan M., "Pricing and cybersales; Internet airline ticket sales and reservations", Feb. 1998, Section: No. 2, vol. 35, p. 64, ISSN: 0002-2543, 4pp.

Adyanthaya, Surain, "Revenue Management: the Black Art." Interavia Business & Technology, Sep. 1998, Section: No. 623, vol. 53, p. 43, ISSN: 0983-1592, 4pp.

"Airfare Bargains on the Net: About E-mail Lists", (http //travel epicurious com/travel/c_planning/02_airfares/email/intro html), Copyright 1998, 17pp.

"Airtech—FlightPass Faq", (http //www airtech com/at_flightpass/at_faqflightpass htm), download date: Oct. 5, 1998, 4pp.

Varian, Hal R., "First Monday: Differential Pricing and Efficiency", (http www firstmonday dk/issues/issue2/different/), Copyright 1996, 18pp.

Kephart, Jeff, "Price Dynamics of Vertically; Introduction", (http //www research ibm com/infoecon...), Aug. 15, 1998, 3pp.

"Bookit Airfare Bidding System (Fax for Your Plane Ticket?)", Consumer Reports Travel Letter, Sep. 1991, Section: vol. 7, No. 9, pp. 97, 106, 3pp.

Nelson, Janet, "Practical Traveler; Airlines Relaxing Policy On No-Refund Tickets", The New York Times, Sep. 22, 1991, Section 5, p. 3, col. 1, Travel Desk, 4pp.

"Traveler's Notes; Easier Airfare Bidding.", Consumer Reports Travel Letter, Oct. 1991, Section: vol. 7, No. 10, p. 119, 1pg.

Website: VendMaster, "Windows for Vending PRO with Inventory", (http //www vendmaster com/pro_inv_main html), download date: Jul. 16, 1998, 2pp.

Website: Optimum Energy Group—Products, "VendingMi$er", (http //www optimumenergy com/products/miser html), download date: Aug. 12, 1998, 2pp.

Burke, Raymond R., "Virtual Shopping: Breakthrough in Marketing Research", Harvard Business Review, Mar.-Apr. 1996, pp. 120-131, 9pp.

PCT International Search Report for Application No. PCT/NO95/00060, dated Oct. 10, 1995, 3pp.

Rehayem, Gilbert, "Opinion: X-Press Betting", La Fleur's Lottery World, Feb 7, 1997, 1pg.

"Save the mark", Financial Times (London), Feb. 1, 1983, Section I, Men & Matters at p. 12, 1pg.

PCT International Search Report for Application No. PCT/US98/21216, dated May 4, 1999, 4pp.

Office Action for U.S. Appl. No. 09/348,566, mailed Oct. 1, 2003, pp. 3-5.

Anthony Joseph, "Baby the engine, and other saving tips", The Christian Science Monitor, Nov. 4, 1986, p. B10, 3p.

"Coupons & more", welcome to coolsavings.com—Copyright 1996-1999.(http://208,134.230.42/cgi-win/tempprs.exe/first.htm), 3pp.

"A personal shopping organizer for the web savvy consumer. My KillerApp offers a personalized shopping experience to meet the unique needs of every individual user". (http://www.killerapp.com/html/main/pr0004.html), Oct. 2, 1998, 2pp.

"New Wave Marketing", Promotion Times, An SCA Quarterly Newsletter—First Quarter, undated, 2pp.

Brochure: "Reaching In New Directions", First Data Corp., Merchant Services, undated, 31pp.

"Global, Second-Generation, and Frequent-Buyer Set New Trends", Marketing News, Jun. 7, 1985, vol. 19, No. 12, p. 18, ISSN: 0025-3790, 1pg.

Lacher, Lisa, "Coupon Gimmick Registers Profits", Business Dateline, Business Record, Dec. 7, 1987, vol. 83, No. 47, Section 1, 2pp.

Stevens, Lawrence, "Hypermarket Challenge", Computerworld, Dec. 19, 1988, Section: Software & Services, 2pp.

McIntyre, Faye, "Small businesses may prefer alternatives to advertising.", South Dakota Business Review, Jun. 1989, vol. 47, No. 4, p. 1(4), ISSN: 0038-3260, 4pp.

"Safeway Introduces Store-Generated Coupons", PR Newswire, May 1, 1990, 1pg.

Ramirez, Anthony, "The Pizza Version of Dialing '911'", The New York Times, Sep. 9, 1991, Late Edition—Final, Section D, p. 1, col. 3, Financial Desk, 4pp.

Blattenberg, Robert C., "Interactive marketing: exploiting the age of addressability.", Sloan Management Review, Sep. 22, 1991, Section: vol. 33, No. 1, p. 5, ISSN: 0019-848X, 15pp.

O'Kane, Gerry, "Parking your car by computer", South China Morning Post, Mar. 23, 1993, Section: Supplement at p. 3, 3pp.

McDowell, Bill, "Frequency marketing builds repeat business; Management", Information Access Company, a Thomson Corporation Company, Reed Publishing USA, Building Supply Home Centers, Aug. 1993, No. 2, vol. 165, p. 96, ISSN: 0890-9008, 5pp.

Arend, Mark, "Debit frenzy? Not quite, but getting there", ABA Banking Journal, Apr. 1994, vol. 86, No. 4, pp. 57-61, ISSN: 0194-5947, 4pp.

Rubel, Chad, "Young firm armed with technology fights an old giant; ETM to Ticketmaster: Let's rock", American Marketing Association, Marketing News TM, Jun. 19, 1995, 3pp.

"Tecmark Reward Terminal", Tecmark Services, Inc., Copyright 1996, (http //www tecmarkinc com/terminal htm), 1pg.

McKinney, Jeff, "Merchant program could pay off for Provident", The Cincinnati Enquirer, Mar. 24, 1996, Section: Financial at p. E02, 2pp.

"Staples The Office Superstore to Participate in Visa 'Rewards for Your Home' Promotion; Savings will be offered to thousands of Visa Staples customers.", Business Wire, Mar. 25, 1996, p3251164, 2pp.

Retailers in small N.D. town join forces (Discount Points Corp launches Discount Points, a multi-retailer consumer discount program), Tire Business, Apr. 29, 1996, vol. 14, No. 2, p. 10, 3pp.

Wagner, Jim, "Cameras Tell Mall What Door You Use, How Often You Go", Albuquerque Tribune, Aug. 9, 1996, Section: Evening, 2pp.

Fickenscher, Lisa, "Amex to Start Free Rewards Program with Discounts on Merchandise", The American Banker, Oct. 18, 1996, Section: Credit/Debit/ATMS at p. 10, 2pp.

Fitzgerald, Kate, "Amex Program Moves Loyalty To Next Level: Custom Extras Finds A Medium Customers Can't Ignore: Billing Statements", Crain Communications Inc., Advertising Age, Nov. 4, 1996, Section: News, 2pp.

"Click this box for extra pepperoni; CyberSlice routes online orders", The Dallas Morning News, Dec. 2, 1996, Section: Business, 2pp.

"Frequent shopper programs are taking off", Grocery Marketing, Jan. 1997, vol. 63, No. 1, p. 54, 2pp.

Fickenscher, Lisa, "Merchant: American Express Seeks to Mine Its Data on Cardholder Spending Patterns", The American Banker, Mar. 24, 1997, Section: Credit/Debit/ATMS at p. 20, 2pp.

"Dispensing the future", Lafferty Publications Limited, Electronic Payments International, May 1997, Section: Feature at p. 12, 5pp.

"Grocery shopping goes on line in many markets; Technology spurs remote ordering concept", The Dallas Morning News, May 12, 1997, Section: Business at p. 2D, 2pp.

"Industry Briefs", Phillips Business Information, Inc., Card News, Jun. 9, 1997, vol. 12, No. 11, 2pp.

Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404, 3pp.

Hoeschen, Brad, "Brookfield Square hopes mall card strikes a chord", The Business Journal of Milwaukee Inc., Business Dateline, Business Journal-Milwaukee, Sep. 12, 1997, vol. 14, No. 50 at p. 19, 2pp.

"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 2pp.

"NCR 7452 Workstation—Beyond Traditional POS", (http //www ncr com/product/retail/products/catalog/7452 shtml), download date: Sep. 23, 1997, 3pp.

"From Our Family to Yours . . . 5 Weeks of Coupon Values for a Valuable Customer", Shoprite, Wakefern Food Corporation, Copyright 1998, 1pg.

Heller, Al, "Chain Pharmacy: Forecast '98: New Technology Advances Pharmacy Productivity", Lebhar-Friedman Inc., Drug Store News, Jan. 12, 1998 at p. CP29, 3pp.

"Advanced Mechanics Internet Specials", (http //www metroplexweb com/advcpn2 htm), download date: Mar. 12, 1998. 2pp.

Website: "New Partners, more exciting rewards: The Membership Rewards program for 1998.", (http //www americanexpress com/rewards/news/docs/1998new_mr shtml), download date: Mar. 12, 1998, 38pp.

Website: "U.P.C. Coupon Code Guidelines Manual", (http //www uc-council org/d31-3 htm), download date: Mar. 12, 1998, l0pp.

Rubinstein, Ed, "Internet Continues to Fortify Takeout Sector for Operators", Lebhar-Friedman Inc., Nation's Restaurant News, Mar. 23, 1998 at p. 55, 5pp.

Information Packet: "My Points®—Universal Rewards Currency", MotivationNet, Inc. Apr. 1998, 29pp.

Hemsley, Steve, "Research and destroy; Point-of-purchase research provides brand managers . . . ", Centaur Communications Ltd., Marketing Week, Apr. 16, 1998, Section: Point of Purchase at pp. 33-36, (3pp).

"WellsPark Group Lauches 'V.I.P. Rewards'; the Most Comprehensive Relationship Marketing Program Ever Created by a Mall Developer", Business Wire, Inc., May 19, 1998, 2pp.

"Catching Red Light Runners", Business Communications Company, Advanced Transportation Technology News, Jun. 1998, vol. 5, No. 2, 2pp.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803, 2pp.

"Acme Markets, U.S. Bancorp Debut visa Rewards Card", Phillips Business Information, Inc., Card News, Jun. 22, 1998, vol. 13, No. 12, 1pg.

Rubinstein, Ed, "Technology: Prepaid program lets Galleria guests dine 'a la Card'", Nations's Restaurant News, (http //www nrn com), Jun. 29, 1998, 1pg.

"DataCard Partners With CSI to Offer Card-Based Loyalty Solution to Merchants", Business Wire, Inc., Jul. 9, 1998, 1pg.

Albright, Mark, "Grocery savings via Web coupons", Times Publishing Company, St. Petersburg Times, Jul. 22, 1998, Section: Business at p. 1E, 2pp.

Campos, Frellie, "Discount shopping program extended to residents. ", Pacific Business News, Sep. 21, 1998, vol. 36, Issue 27, p. 32, 3/5p, ISSN: 0030-8552, 3pp.

"Garage management needs", "Unit Tracking with the General Manager Professional", (http www dacobusy com/garage/idxgarg htm), download date: Mar. 16, 1999, 2pp.

"Route Sales Automation—Track customers, orders, sales, and inventory! Route accounting, . . . ", "Point of sale system carried in the palm of your hand", (http //www dacobusy com/), download date: Mar. 16, 1999, 1pg.

"Alphatech, Inc., Looking to the Future", (http //www alphatech com/), download date: Mar. 25, 1999,1pg.

"Alphatech: Technologies and Projects", (http //www alphatech com/secondary/techpro/compvis html), download date: Mar. 25, 1999, 1pg.

"IMPS: Vehicle License Plate Recognition System", "IMPS™ Integrated Multi-Pass System State of the Art Vehicle License Plate Recognition System", (http www singapore com/optasia/imps), download date: Mar. 25, 1999, 3pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999,2pp.

"Welcome to Q Lube!", (http //www qlube com/), download date: Mar. 25, 1999, 1pg.

PCT Notification of Transmittal of the International Search Report or the Declaration for PCT/US99/22650, Dated Mar. 16, 2000, l0pp.

Jagsi, Ajay et al., "Cocoa-Cola & The 'Smart' Vending Machines", (http //mba Vanderbilt edu/mike sher/courses/netecon/lecture/grpl ppt), download date: Jul. 17, 2003, 12 pp.

PCT Notification of Transmittal of the International Search Report or the Declaration for PCT/US99/21720, Dated Mar. 23, 2000, 7pp.

Website: "Pricing, The Professional Pricing Society Conference Agenda", (http //www pricing-advisor com/conf_agn htm), download date: Jun. 19, 1999, l0pp.

Press Release, "Priceline.com Delivers Savings For Flexible Travelers in Side-By-Side Price Compairson", Priceline.com, Stamford, CT, May 28, 1999, 4pp.

"Travel Industry Bellwether for All Commerce Players", Jupiter Communications, Copyright 1999, Jupiter Strategic Planning Services, 2pp.

"Circuit City to Integrate E-Commerce with store shopping; retailer's E-superstore—www.circuitcity.com- to Open in July", PR Newswire, Jun. 15, 1999; Section: Financial News, 3pp.

"Wal-Mart vs. Amazon: The fight begins"; Yahoo News, Jun. 9, 1999, 3pp.

"Mercata—Group Buying Power", (http://www.mercata.com/cgi-bin/mercata/mercata/v1/pages/home.jsp), download date: Jun. 7, 1999, 5pp.

David Lazarus, "E-Commerce, Japanese style", Wired online page, Jun. 7, 1999, 3pp.

"Kmart expands inventory via in-store kiosks", Jun. 20, 1999, RTNews; (www.retailtech.com), 1pg.

"WebVoucher", (www.pinex.co.uk/webvoucher/), download date: Mar. 14, 1999, 2pp.

Quinn, Jane Byrant, "New Cars for Less", Newsweek; Oct. 23, 1978; Section: The Columnists; p. 80, 2pp.

"My Auto Broker—Online Auto Broker", (http://www.adverlink.com/myautobroker/), download date: May 28, 1997, 4pp.

Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4pp.

"About CyberSlice", (http://www.cyberslice.com/cgi-bin/WebObjects/CyberSlice:2@httpserv01/), download date: May 6, 1997, 2pp.

"PriceWatch", (http://icon.co.za/-robo/prod01.htm), Jan. 14, 1997, 5pp.

PCT International Search Report for Application No. PCT/US97/13588, dated Dec. 4, 1997, 2pp.

Henry, Anne, "High-tech vending: vending machine OEMs begin to resemble their consumer electronics counter parts when it comes to rapid-fire implementation of technology; original equipment manufacturers", Appliance, Dec. 1991, Section: vol. 48, No. 12, p. 39, ISSN: 0003-6781, 5pp.

Davis, Tim "Vending suppliers scurry to meet Coke-Mandated vendor communication", Automatic Merchandiser, Dec. 1992, pp. 62-64, 2pp.

Kohda, Youji, Endo, Susumu, "Ubiquitous Advertising on the WWW: Merging Advertisement on the Browser", Computer Networks and SDN Systems 28, May 1, 1996 at pp. 1493-1499, 8pp.

"Coupon acceptor; Coinco", Beverage Industry, Jul. 1998, No. 7, vol. 89, p. 38, 2pp.

"Coinco offers BA-30 dollar bill acceptor", Automatic Merchandiser, Aug. 1998, p. 43, 2pp.

Conlon et al. "Press 1 for profit." Sales and Marketing Management. Sep. 1998,6pp.

Rich Karlgaard, "Keep your eyes on the prize", Forbes, Sep. 21, 1998, p. 43, 3pp.

PCT International Search Report for Application No. PCT/US98/21216, dated May 4, 1999, 4pp.

PCT International Search Report for Application No. PCT/US00/13349, dated Nov. 9, 2000, 5pp.

Burke, Raymond R. "Do You See What I See? The Future of Virtual Shopping." Journal of the Academy of Marketing Science, vol. 25, No. 4, pp. 352-360, Fall 1997, 17pp.

"Coke's Automatic Price Gouging", The San Francisco Chronicle, Oct. 29, 1999, Section: Editorial, 1 page.

"Cape Town", Reuters Ltd, Nov. 8, 1979, PM Cycle.

Cook, Louise, "ConsumerWatch: Clip, Snip, Save", The Associated Press, Mar. 12, 1984, Business News Section.

Greene, Jan, "Farm bills please assns; National Grocers Association", Supermarket News, vol. 35, Dec. 23, 1985 at p. 6.

"POS spectrum: a lottery looks to POS for growth", UMI, Inc., POS News, Jan. 1989, vol. 5, No. 7, p. 8, ISSN: 0896-6230, CODEN: BHORAD.

Kuttner, Robert, "Computers May Turn the World Into One Big Commodities Pit", Business Week, Sep. 11, 1989, Section: Economic Viewpoint, No. 3123 at p. 17.

Schrage, Michael, "An Experiment in Economic Theory; Labs Testing Real Markets", The Record, Nov. 26, 1989, Section: Business at p. B01.

"Let's Play the Cash Register Receipts Lottery", The New York Times, Dec. 25, 1990, Section 1, p. 30, col. 4, Editorial Desk.

Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals at p. 22.

Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082.

"Philips offers customers financing through Citicorp; Philips Medical Systems North America, Citicorp North America Inc." Health Industry Today, Jun. 1991, Section: vol. 54, No. 6, p. 4, ISSN: 0745-4678.

Pelline, Jeff, "Travelers Bidding on Airline Tickets SF firm offers chance for cut-rate fares" The San Francisco Chronicle, Aug. 19, 1991, Sections: News at p. A4.

Fink, Ronald, "Data processing: Pepsico.", Financial World, Sep. 29, 1992, vol. 161, No. 19, p. 52(1), ISSN: 0015-2064.

Gilbert, Allan Z., "Operators can gain with creative merchandising", Automatic Merchandiser, Oct. 1992, p. 80, ISSN: 1061-1797.

"Coupons get serious; supermarkets use barcodes to prevent misredemptions", Chain Store Age Executive with Shopping Center Age, Oct. 1992, Section: vol. 68, No. 10, p. 68, ISSN: 0193-1199.

"Winn-Dixie/The Salvation Army Report Contributions for War Against Hunger", PR Newswire, Jun. 10, 1993, Section: Financial News.

Gelernter, David, "The Cyber-Road Not Taken; Lost on the Info-Highway? Here's Some Stuff that Could Really Change Your Life", The Washington Post, Apr. 3, 1994, Section: Outlook, p. C1.

Jones, Jeanne, "Data Readers Streamline Management; Scanner Technology Aids Retailers As Well As Plants, Wholesalers", The Houston Post, Jun. 26, 1994, Section: Business at p. D1.

Fiorini, Phillip, "'No Place for Penny?'/Smallest coin doesn't make cents to some", USA Today, Jul. 29, 1994, Section: News at p. 1A.

Smith, Alison, "Survey of UK Consumer Credit and Asset Finance", Financial Times, Nov. 3, 1994, Section: p. VI.

Website: "FAQ: CSH Coke Machine Information", Institute of Information & Computing Sciences, (http //www cs uu nl/wais/html/na-dir/csh-coke-machine-info html), Feb. 4, 1995.

Andreoli, Tom et al., "Cash Machines Offer a Whole Lotto Money for Withdrawl; An Unfortunate Juxtaposition; Block That Metaphor!; Something Street Talk; Fishy in Springfiled; State Street Sears?; Champion As Underdog; A 'Whole Language' Graduate", Crain's Chicago Business, Jun. 19, 1995, Section: News at p. 8.

"Spain: BBV launches new card", Cards International, Jun. 22, 1995 at p. 5.

Knippenberg, Jim, "Will local radio empires strike back?", The Cincinnati Enquirer, Jul. 23, 1995, Section: Tempo at p. F01.

Brochure, "Cyber Bid", Net Fun Ltd., Copyright 1996.

Hays, Contance, "Coke Tests Unit That Can Hike Prices in Hot Weater", The New York Times, Oct. 28, 1999, 3 pp.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK.

Hadley, Kimberly, "Pastors praying anti-arson effort will burn bias", The Nashville Banner, Jul. 26, 1996, Section: News at p. A13.

Gapper, John, "NatWest reports rise in bad debt", Financial Times, Jul. 31, 1996, Section: News: UK; at p. 09.

Gilbert, Allan Z., "A call to action for wireless data communication", Automatic Merchandiser, Aug. 1996, Financial Management section.

"Lynx Technology: Lynx to provide business leasing programme through Schroder Leasing", M2 Presswire, Aug. 9, 1996.

Taylor, Paul, "Towards a dream market", Financial Times (London), Sep. 4, 1996, Section: Survey—FT IT; at p. 03.

"Public Internet Kiosks, Inc. Receives First Order for Its 'Internet Station'—The Vending Machine of the Future", PR Newswire, Sep. 16, 1996.

Singletary, Michelle, "Electronic World, Unchecked Problem? U.S. Move to Paperless Payments Raises Worries About Those Who Don't Use Banks", The Washington Post, Mar. 4, 1997, Section: Financial at p. C01.

Hirschfeld, David, "Increasing Profits Through Automation", Independent Vendors Association Quarterly, Apr./May/Jun. 1997.

French, Simone A. et al., "A Pricing Strategy to Promote Low-Fat Snack Choices through Vending Machines", American Journal of Public Health, May 1997, vol. 87, No. 5.

"Avco Financial Services", National Home Furnishing Association, (http //www homefurnish comNHFA/avco htm), download date: May 23, 1997.

Website, "Catalina Marketing Corporation", (http //catalinamktg com/prodcdir htm), download date: May 29, 1997.

Riordan, Teresa, "Patents; A novel approach to making a better spermicide harks back to some old-fashioned methods", The New York Times, Jun. 9, 1997, Section D, p. 2, col. 1, Business/Financial Desk.

Nairn, Geoff, "The key to your identity: Falling costs will allow fingerprint verification to be widely used, reports Geoff Nairn", Financial Times (London), Jul. 15, 1997, Section: Technology; at p. 12.
"The United Computer Exchange, How It All Works", (http //www uce com/howitworks html), download date: Jul. 23, 1997.
"Classified 2000: The Internet Classifieds", Classifieds2000, Inc., (http //www classifieds2000 com/cgi-cls/Display exe?C2K+aboutus), download date: Aug. 6, 1997.
"General trading information and terms provided by tradingfloor. com", (http //www tradingfloor com/info htm), download date: Aug. 14, 1997.
"NASDAQ", Information Sheet, (http //home axford com/corfin/corfl 1 htm), download date: Aug. 15, 1997.
Brochure, "For the Crew & the Customer: The Best Drive-Thru & Grill Service", Olivetti North America, Winter 1998.
"VendMaster: Windows and Vending Software, Reports", (http //www vendmaster com/reports_main html), download date: Feb. 6, 1998.
King, Brad, "Music competition; With MP3s under attack and major labels designing new standards, three Bay Area firms try to corner the market on online music", SF Weekly, Apr. 28, 1999, Section: Music.
Turnis, Jane, "Charity Begins with Pepsi Recycling Can in Colorado Springs, Colo.", The Gazette (Colorado Springs), Dec. 9, 1998.
PCT International Search Report for International Application No. PCT/US98/21216, filed Oct. 8, 1998, in the name of Tedesco et al., and entitled "Method and Apparatus for Dynamically Managing Vending Machine Inventory Prices", mailed May 4, 1999.
Ringle, Ken, "The Sell Phone: Dial 'M' for Munchies", The Washington Post, Jun. 19, 1999, Section: Style, p. C01.
Walker, Leslie, "A Sales Pitch With That Soda?" The Washington Post, Jun. 24, 1999, Section: Financial, p. E01.
"'Digital kiosks' at train stations to offer news, music, games", Deutsche Presse-Agentur, Jul. 15, 1999, Section: International News.
"Mitsubishi's New ChipConnect Software Development Kits and Reference Designs Enable Web-Controlled Embedded Systems Using em Ware's EMIT Architecture", Business Wire, Jul. 19, 1999.
Heid, Jim, "The Hits Just Keep on Coming as Downloadable Music Rocks the Web", PC World, Aug. 1999.
"Asia's first EAT on Ice opens", Travel Trade Gazette Asia, Oct. 1, 1999, Section: Business.
Skinner, Greg, "Digitalia: ratings and ravings", Kidscreen, Oct. 1, 1999, Section: New Media, The Cyber Space, p. 40.
"Briefing—Asia Information Technology", Asia Pulse, Feb. 18, 2000, Section: General News.
"Vending machines go high-tech", Journal of Business, Mar. 9, 2000, Section: vol. 15, No. 6, p. A1, ISSN: 10756124.
"USA Technologies Expands Distribution of TransAct Credit Card Device & Payment System", Business Wire, Apr. 27, 2000.
"USA Technologies Targets e-Port At Interactive Media Market; Innovative Internet Appliance Featured at @d:tech Internet Conference; Adtech2000", Business Wire, May 9, 2000.
"Coinstar Launches Turn-Key Philanthropic Initiative for Supermarket Partners; Retailers Can Now Tailor Coins That Count Programs to Support Local Non-Profits", Business Wire, May 10, 2000.
"MP3.com and Djangos.com Partner to Re-Invent Retail Music Industry; Alliance Provides Consumers with Instant Online Access to Purchased CDs", PR Newswire, Jun. 14, 2000, Section: Financial News.
"Are in-store kiosks the future?", Music Week, Jun. 24, 2000, Section: p. 22.
"USA Technologies Files 15 More Patents to Protect e-Port Internet Appliance Device", Business Wire, Jun. 26, 2000.
"E-tailer Notes: The Outernet, planned entertainment chain . . . ", Audio Week, Aug. 28, 2000.
"Re Directorate", Regulatory News Service, Sep. 1, 2000.
Website: "USEDvending.com—New Personal Care Products Vending Machines", (http //www usedvending com/newpersonalcare htm), download date: Oct. 24, 2000.
Website: "e-vending.com homepage—Vending, Joke & Vending Machines", (http www e-vending com/jokes htm), download date: Oct. 24, 2000.

Berk, Christina Cheddar, "Many Vending Machines Opt Out of High-Tech Fixes", The Wall Street Journal Online, (http //online wsj com/article_email/), download date: Nov. 5, 2003.
"Marcus Theatres Corporation First to Offer eKiosk High-Speed Internet Access to Movie Goers", PR Newswire, Aug. 21, 2000.
Brochure: "Combo 3/6—Snack Food/Cold Drink Combination Vendor", U-Select-It, a Wittern Group Company, (www uselectit com), undated.
Brochure: "Multi-max Distributed Vending System", Fortune Resources, Inc., (www multi-max com), undated.
Brochure: "World Class Compact Series—Snack & Cold Can Merchandiser", Raddatz Product Development Corp., (www rpdvending com), undated.
Maras, Elliot, "Software opens doors to scientific machine menuing", Automatic Merchandiser, Feb. 1996, Section: p. 36, ISSN: 0002-7545.
Choate, Robert, "Why technology brings a great future for vending", Automatic Merchandiser, Oct. 1, 1997, Section: No. 10, vol. 39, p. 16, 1061-1797.
Brochure: "The VC3800 Combination Vendo", Effective Nov. 13, 2002, Seaga Manufacturing, Inc., (www seagamfg com).
Sereno, Jennifer, "Vending machines get fancier", Wisconsin State Journal, Mar. 27, 2004, Section: Business.
Website: "E-vending.com—Snack Vending Machines, Online Vending Machine Catalog", (http www e-vending com/combo_snack_pop_vending_machines_photos htm), download date: Jul. 1, 2004.
Samuelson, Paul A., "Economics $8^{th}$ Edition", McGraw-Hill Book Company, Copyright 1948, 1951.
Brochure, "Introducing the Digital MenuBoard", Siren Technologies, Inc., (www sirentech com).
U.S. Examiner's Office Action dated Nov. 27, 2000, U.S. Appl. No. 09/218,085, filed Dec. 22, 1998 22 pages.
U.S. Examiner's Office Action dated Jul. 27,2001, U.S. Appl. No. 09/218,085, filed Dec. 22, 1998 25 pages.
U.S. Examiner's Office Action dated Nov. 1, 2002, U.S. Appl. No. 09/218,085, filed Dec. 22, 1998 25 pages.
U.S. Examiner's Office Action dated Oct. 19, 2004, U.S. Appl. No. 09/218,085, filed Dec. 22, 1998 23 pages.
U.S. Examiner's Office Action dated Aug. 10, 2005, U.S. Appl. No. 09/218,085, filed Dec. 22, 1998 5 pages.
U.S. Examiner's Office Action dated Mar. 9, 2006, U.S. Appl. No. 09/218,085, filed Dec. 22, 1998 5 pages.
U.S. Examiner's Office Action dated Nov. 24, 2006, U.S. Appl. No. 09/218,085, filed Dec. 22, 1998 6 pages.
U.S. Examiner's Office Action dated May 23, 2007, U.S. Appl. No. 09/218,085, filed Dec. 22, 1998 8 pages.
U.S. Examiner's Office Action dated Mar. 9, 2006, U.S. Appl. No. 11/426,328, filed Jun. 26, 2006 6 pages.
U.S. Examiner's Office Action dated Mar. 9, 2006, U.S. Appl. No. 11/426,332, filed Jun. 26, 2006 5 pages.
U.S. Examiner's Office Action dated Aug. 26, 2006, U.S. Appl. No. 11/426,332, filed Jun. 26, 2006 5 pages.
U.S. Examiner's Office Action dated Aug. 26, 2005, U.S. Appl. No. 10/095,372, filed Mar. 11, 2002 12 pages.
U.S. Examiner's Office Action dated Aug. 26, 2005, U.S. Appl. No. 10/095,372, filed Mar. 11, 2002 8 pages.
Notice of Allowability dated Mar. 4, 2005, U.S. Appl. No. 10/095,372, filed Mar. 11, 2002 14 pages.
U.S. Examiner's Office Action Dated May 4, 2007, U.S. Appl. No. 11/426,204, filed Jun. 23, 2006 5 pgs.
U.S. Examiner's Office Action Dated May 4, 2007, U.S. Appl. No. 11/426,215, filed Jun. 23, 2006 5 pgs.
U.S. Examiner's Office Action Dated May 4, 2007, U.S. Appl. No. 11/426,221, filed Jun. 33, 2006 5 pgs.
"NCR 7453 PC-Based Point-of-Sale Solution", Copyright 1998, NCR Corporation, 1 pg.
"Planet City Y2K Sales Program to Benefit Non-Profits" PR Newswire, New York; Aug. 30, 1999, 2 pp.
Online shopping gives schools new fund-raising tool EDUCATION: Websites donate percentages of purchases, but PTA's proceed cautiously, [Morning Edition]; Elizabeth Chey; Orange County Register; Santa Ana, California; Nov. 21, 1999; 2 pp.

School Fund-Raising Goes Online (Yes, You Can Still Buy Wrapping Paper) Peggy O'Crowely Newhouse News Service, Washington, Oct. 11, 1999, 2 pp.

Pushing for Plastic, Ken Clark; Chain Store Age; May 2000; 1 pg.

WAL-MART to Contribute Through Vending Machines (City Edition) Greensboro News Record; Greensboro, N.C. May 10, 1995, 1 pg.

Pepsi Wins Contract, Coke is Out at APS, Rebecca Roybal Journal Staff Writer, Albuqerque Journal; Albuquerque, N.W. May 25, 2000, 3 pp.

People and events; Herald, Rock Hill, S.C. Jun. 1, 1995, 2 pp.

Manning, Steven, Students for Sale', The Nation, New York, Sep. 29, 1999, 5 pp.

Businessline, Chennai, "Testing Limits of Corporate Sponsorships", Oct. 17, 1999, 3 pp.

"Coca-Cola's School Deal not too Hard to Swallow", Seattle Times; Seattle Washington, 2 pp.

Riordan, Teresa, "Funneling Change to Useful Pursuits", The New York Times, Jun. 9, 1997, 3 pp.

Gay, Stephen W. "Local Businesses Adopt School", Tulsa World, Sep. 6, 1995, 2 pp.

Riordan, Teresa, "Patents; A novel approach to making a better spermicide harks back to some old-fashioned methods", The New York Times, Jun. 9, 1997, Section D, p. 2, col. 1, Business/Financial Desk, 3 pp.

"www.prizepoint.com is Live On the Internet!; New 'Reward Entertainment' Meets Needs of Growing Mass-Market Audience Online" Business Wire Feb. 1, 1999, 4 pp.

"VendMaster Windows and Vending Software News", Independent Vendors' Association Quarterly, (http://www.vendmaster.com/news_main.html), Apr./May/Jun. 1997, 10pp.

"In Online Auction First, Auction Universe Offers a 10% Rebate On Purchases During April" Business Wire Apr. 6, 1999, 3 pp.

Vickers, Amy, "Clicks mean points in the loyalty game; The success of offline loyalty schemes has been the model for online imitations, but consumers need greater flexibility" New Media Age, Section: Loyalty; pp. 12-16 Apr. 29, 1999, 6 pp.

Corey, Matt, "Clip 'n' pay; proposed increase in coupon processing fees raises production cost issues" Food and Beverage Marketing, Section: No. 6, vol. 18; p. 18; ISSN: 0731-3799 Jun. 1, 1999, 4 pp.

Petersen, Scot, "New breed of auctioneer moving into mainstream; online auctions; Industry Trend or Event" PC Week, p. 30; ISSN: 0740-1604 Nov. 8, 1999, 2 pp.

"Creating reward programmes that really encourage loyalty; Loyalty schemes need to be simple, encourage redeeming and recognise long-standing customers says David Rankin" Brand Strategy, Section: Features; p. 8 Jan. 21, 2000, 5 pp.

"Using Aadvantage Miles" American Airlines—American Eagle, download Feb. 10, 2000, 11 pp.

"PrizePoint Entertainment: Learn More" http://www.prizepoint.com, download Feb. 10, 2000, 1 pg.

"Surfbuzz" http://www.surfbuzz.com download date Jun. 8, 2000, 4 pp.

Office Action for U.S. Appl. No. 09/012,163 mailed Jan. 10, 2001, 13 pp.

Notice of Allowance for U.S. Appl. No. 09/012,163 mailed Jul. 27, 2001, 6 pp.

Office Action for U.S. Appl. No. 09/612,163 mailed Feb. 29, 2000, 7 pp.

Office Action for U.S. Appl. No. 09/012,163 mailed Jul. 6, 2000, 22 pp.

Office Action for U.S. Appl. No. 09/012,163 mailed Sep. 29, 1999, 20 pp.

Notice of Allowance for U.S. Appl. No. 10/095,372 mailed Jul. 6, 2006, 40 pp.

Notice of Allowance for U.S. Appl. No. 10/095,372 mailed Feb. 12, 2007, 18 pp.

Office Action for U.S. Appl. No. 11/761,791 mailed Mar. 31, 2010, 7 pp.

Office Action for U.S. Appl. No. 11/761,826 mailed Apr. 1, 2010, 13 pp.

Office Action for U.S. Appl. No. 11/761,842 mailed Mar. 31, 2010, 7 pp.

Office Action for U.S. Appl. No. 09/713,001 mailed Jul. 12, 2004, 8 pp.

Notice of Allowance for U.S. Appl. No. 10/994,913 mailed Jan. 11, 2007, 4 pp.

Office Action for U.S. Appl. No. 10/994,913 mailed Feb. 28, 2006, 6 pp.

Office Action for U.S. Appl. No. 10/994,913 mailed Aug. 16, 2005, 7 pp.

Notice of Allowance for U.S. Appl. No. 11/745,796 mailed Apr. 30, 2009, 4 pp.

Office Action for U.S. Appl. No. 11/745,796 mailed Oct. 6, 2008, 5 pp.

Office Action for U.S. Appl. No. 11/745,796 mailed Feb. 22, 2008, 5 pp.

PCT International Search Report for International Application No. PCT/US98/21216, filed Oct. 8, 1998, in the name of Tedesco et al., and entitled "Method And Apparatus For Dynamically Managing Vending Machine Inventory Prices", mailed May 4, 1999, 4 pp.

Notice of Allowance for U.S. Appl. No. 11/745,876 mailed Jan. 27, 2010, 6 pp.

Notice of Allowance for U.S. Appl. No. 11/745,876 mailed Oct. 16, 2009, 6 pp.

Office Action for U.S. Appl. No. 11/745,876 mailed Jun. 19, 2009, 9 pp.

Office Action for U.S. Appl. No. 11/282,525 mailed Mar. 17, 2010, 43 pp.

Examiner's Answer for U.S. Appl. No. 10/902,347 mailed Oct. 22, 2009, 21 pp.

Office Action for U.S. Appl. No. 10/902,347 mailed Nov. 26, 2008, 16 pp.

Notice of Allowance for U.S. Appl. No. 11/426,204 mailed Oct. 20, 2008, 4 pp.

Notice of Allowance for U.S. Appl. No. 11/426,204 mailed Sep. 8, 2008, 6 pp.

Office Action for U.S. Appl. No. 11/426,204 mailed Jul. 3, 2008, 5 pp.

Notice of Allowance for U.S. Appl. No. 11/877,109 mailed Apr. 29, 2010, 4 pp.

Office Action for U.S. Appl. No. 11/877,109 mailed Nov. 5, 2009, 5 pp.

Office Action for U.S. Appl. No. 10/902,397 mailed Jan. 6, 2010, 10 pp.

Office Action for U.S. Appl. No. 10/902,397 mailed May 18, 2009, 9 pp.

Office Action for U.S. Appl. No. 11/426,163 mailed Mar. 31, 2010, 12 pp.

Office Action for U.S. Appl. No. 11/426,163 mailed Aug. 18, 2009, 7 pp.

Office Action for U.S. Appl. No. 11/426,163 mailed May 21, 2008, 15 pp.

Examiner's Answer for U.S. Appl. No. 11/426,172 mailed Oct. 15, 2009, 14 pp.

Office Action for U.S. Appl. No. 11/426,172 mailed Jan. 7, 2009, 12 pp.

Office Action for U.S. Appl. No. 11/426,172 mailed Jul. 28, 2008, 9 pp.

Office Action for U.S. Appl. No. 11/426,186 mailed Sep. 28, 2009, 14 pp.

Office Action for U.S. Appl. No. 11/426,186 mailed Mar. 10, 2009, 14 pp.

Written Opinion for PCT/US0425497 mailed Dec. 15, 2005, 3 pp.

International Search Report for PCT/US0425497 mailed Dec. 15, 2005, 2 pp.

Office Action for U.S. Appl. No. 10/855,247 mailed Sep. 1, 2009, 26 pp.

Office Action for U.S. Appl. No. 11/757,891 mailed Dec. 9, 2009, 13 pp.

Office Action for U.S. Appl. No. 11/426,186, dated Sep. 15, 2008, 12pp.

International Search Report for PCT/US04/16895 2 pp.

Written Opinion for PCT/US04/16895, 3 pp.

Supplementary European Search Report for European Application No. 04753679, 2 pp.

Examiner's Answer for U.S. Appl. No. 11/426,172 mailed Oct. 15, 2009, 14 pp.

U.S. Appl. No. 08/943,483, "System and Method for Facilitating Acceptance of Conditional Purchase Offers (CPO's)." Filed Oct. 3, 1997, 50 pp.

U.S. Appl. No. 09/219,267, "Method and Apparatus for Facilitating Electronic Commerce Through Providing Cross-Benefits During a Transaction" Filed Dec. 23, 1998, 51 pp.

Examiner's Answer for U.S. Appl. No. 11/426,172 mailed Oct. 15, 2009, 14 pp.

Office Action for U.S. Appl. No. 10/902,397, dated May 21, 2008, 17 pp.

U.S. Appl. No. 09/274,281, "Method and Apparatus for Providing Cross-Benefits via a Central Authority" Filed Mar. 22, 1999, 76 pp.

U.S. Appl. No. 09/282,747, "Method and Apparatus for Providing Cross-Benefits Based on a Customer Activity" Filed Mar. 31, 1999, 89 pp.

U.S. Appl. No. 09/322,351, "Method and Apparatus for Providing Cross-Benefits and Penalties" Filed May 28, 1999, 86 pp.

Office Action for U.S. Appl. No. 09/219,267 mailed Feb. 14, 2002, 17 pp.

Office Action for U.S. Appl. No. 09/219,267 mailed Jan. 9, 2004, 29 pp.

Office Action for U.S. Appl. No. 09/219,267 mailed Dec. 14, 2004, 24 pp.

Office Action for U.S. Appl. No. 09/219,267 mailed Mar. 6, 2006, 21 pp.

Office Action for U.S. Appl. No. 09/219,267 mailed Sep. 7, 2007, 23 pp.

Office Action for U.S. Appl. No. 09/219,267 mailed Jun. 13, 2008, 13 pp.

Office Action for U.S. Appl. No. 09/219,267 mailed Mar. 10, 2009 16 pp.

Office Action for U.S. Appl. No. 09/219,267 mailed Jan. 5, 2010, 17 pp.

Office Action for U.S. Appl. No. 09/274,281 mailed Apr. 12, 2002, 10 pp.

Office Action for U.S. Appl. No. 09/274,281 mailed Jul. 27, 2005, 9 pp.

Office Action for U.S. Appl. No. 09/274,281 mailed Oct. 31, 2006, 13 pp.

Office Action for U.S. Appl. No. 09/274,281 mailed Jun. 29, 2007, 5 pp.

Office Action for U.S. Appl. No. 09/274,281 mailed May 5, 2008, 7 pp.

Office Action for U.S. Appl. No. 09/274,281 mailed Feb. 20, 2009, 4 pp.

Notice of Allowance for U.S. Appl. No. 09/274,281 mailed Jun. 9, 2010, 5 pp.

Office Action for U.S. Appl. No. 09/282,747 mailed Mar. 1, 2002, 20 pp.

Office Action for U.S. Appl. No. 09/282,747 mailed Apr. 13, 2004, 17 pp.

Office Action for U.S. Appl. No. 09/282,747 mailed Dec. 7, 2004, 12 pp.

Office Action for U.S. Appl. No. 09/282,747 mailed Mar. 21, 2006, 22 pp.

Office Action for U.S. Appl. No. 09/282,747 mailed Feb. 27, 2007, 24 pp.

Office Action for U.S. Appl. No. 09/282,747 mailed Jun. 12, 2008, 15 pp.

Office Action for U.S. Appl. No. 09/282,747 mailed Mar. 4, 2009, 17 pp.

Office Action for U.S. Appl. No. 09/282,747 mailed Dec. 10, 2009, 16 pp.

Office Action for U.S. Appl. No. 09/282,747 mailed Sep. 7, 2007, 28 pp.

Office Action for U.S. Appl. No. 09/322,351 mailed Sep. 25, 2001, 22 pp.

Office Action for U.S. Appl. No. 09/322,351 mailed May 2, 2002, 25 pp.

Office Action for U.S. Appl. No. 09/322,351 mailed May 21, 2004, 21 pp.

Office Action for U.S. Appl. No. 09/322,351 mailed Nov. 19, 2004, 22 pp.

Office Action for U.S. Appl. No. 09/322,351 mailed Mar. 13, 2006, 20 pp.

Office Action for U.S. Appl. No. 09/322,351 mailed Nov. 30, 2006, 25 pp.

Office Action for U.S. Appl. No. 09/322,351 mailed Aug. 20, 2007, 30 pp.

Office Action for U.S. Appl. No. 09/322,351 mailed Apr. 17, 2008, 18 pp.

Office Action for U.S. Appl. No. 09/322,351 mailed Aug. 4, 2009, 20 pp.

Office Action for U.S. Appl. No. 11/761,826 mailed Aug. 16, 2010, 15 pp.

Final Office Action for U.S. Appl. No. 11/282,525 mailed Aug. 30, 2010, 53 pp.

Office Action for U.S. Appl. No. 11/426,163 mailed Sep. 29, 2010, 10 pp.

Notice of Allowance for U.S. Appl. No. 09/219,267 mailed Aug. 30, 2010, 7 pp.

Supplemental Notice of Allowance for U.S. Appl. No. 09/274,281 mailed Sep. 2, 2010, 3 pp.

Notice of Allowance for U.S. Appl. No. 09/282,747 mailed Aug. 30, 2010, 7 pp.

Notice of Allowance for U.S. Appl. No. 11/877,109 mailed Jul. 27, 2010, 4 pp.

* cited by examiner

PRODUCTS AND PROCESSES FOR VENDING A PLURALITY OF PRODUCTS VIA DEFINED GROUPS

CROSS-REFERENCE TO RELATED APPLICATIONS

The present application is a divisional of U.S. patent application Ser. No. 11/426,215, filed Jun. 23, 2006 now abandoned, entitled "PRODUCTS AND PROCESSES FOR VENDING A PLURALITY OF PRODUCTS VIA DEFINED GROUPS"; which is a continuation of U.S. patent application Ser. No. 10/902,347, filed Jul. 29, 2004, entitled "PRODUCTS AND PROCESSES FOR VENDING A PLURALITY OF PRODUCTS VIA DEFINED GROUPS"; which claims the benefit of priority of the following provisional patent applications:

(a) U.S. Provisional Patent Application No. 60/491,215, filed Jul. 30, 2003, entitled "APPARATUS, SYSTEM AND METHOD FOR VENDING A COMBINATION OF PRODUCTS";

(b) U.S. Provisional Patent Application No. 60/536,277, filed Jan. 13, 2004, entitled "APPARATUS, SYSTEM AND METHOD FOR VENDING A COMBINATION OF PRODUCTS"; and (c) U.S. Provisional Patent Application No. 60/560,960, filed Apr. 9, 2004, entitled "APPARATUS, SYSTEM AND METHOD FOR VENDING A COMBINATION OF PRODUCTS".

Each of the above-referenced applications is incorporated by reference herein in its entirety.

The present application-is also related to:

(d) U.S. patent application Ser. No. 10/902,397, filed Jul. 29, 2004, entitled "PRODUCTS AND PROCESSES FOR VENDING A PLURALITY OF PRODUCTS";

(e) U.S. patent application Ser. No. 11/426,163, filed Jun. 23, 2006, entitled "PRODUCTS AND PROCESSES FOR VENDING A PLURALITY OF PRODUCTS";

(f) U.S. patent application Ser. No. 11/426,172 filed Jun. 23, 2006, entitled "PRODUCTS AND PROCESSES FOR VENDING A PLURALITY OF PRODUCTS";

(g) U.S. patent application Ser. No. 11/426,186 filed Jun. 23, 2006, entitled "PRODUCTS AND PROCESSES FOR VENDING A PLURALITY OF PRODUCTS";

(h) U.S. patent application Ser. No. 11/426,204 filed Jun. 23, 2006, entitled "PRODUCTS AND PROCESSED FOR VENDING A PLURALITY OF PRODUCTS VIA DEFINED GROUPS";

(i) U.S. patent application Ser. No. 11/426,221, filed Jun. 23, 2006, entitled "PRODUCTS AND PROCESSES FOR VENDING A PLURALITY OF PRODUCTS VIA DEFINED GROUPS"; and (j) U.S. patent application Ser. No. 11/877,109 filed Oct. 23, 2007, entitled "PRODUCTS AND PROCESSES FOR VENDING A PLURALITY OF PRODUCTS VIA DEFINED GROUPS".

BACKGROUND

Traditional vending machines respond to changes in supply, demand, and customer behavior ineffectively, especially when compared to the abilities of, e.g., human salespeople.

Applicants have previously recognized that significant benefits ensue from vending machines configured to dynamically respond to market forces by, for example, identifying a combination of products and offering the combination of products for a promotional price. For example, a parent application, U.S. patent application Ser. No. 10/095,372, enables the creation of promotional product combinations based on supply and/or demand data.

The advantages of Applicants' previous inventions are significant. Nevertheless, given the complexity of the relevant market forces, it would be advantageous for vending machine systems and methods that dynamically respond to market forces by offering a combination of products.

DETAILED DESCRIPTION

Figure 1:
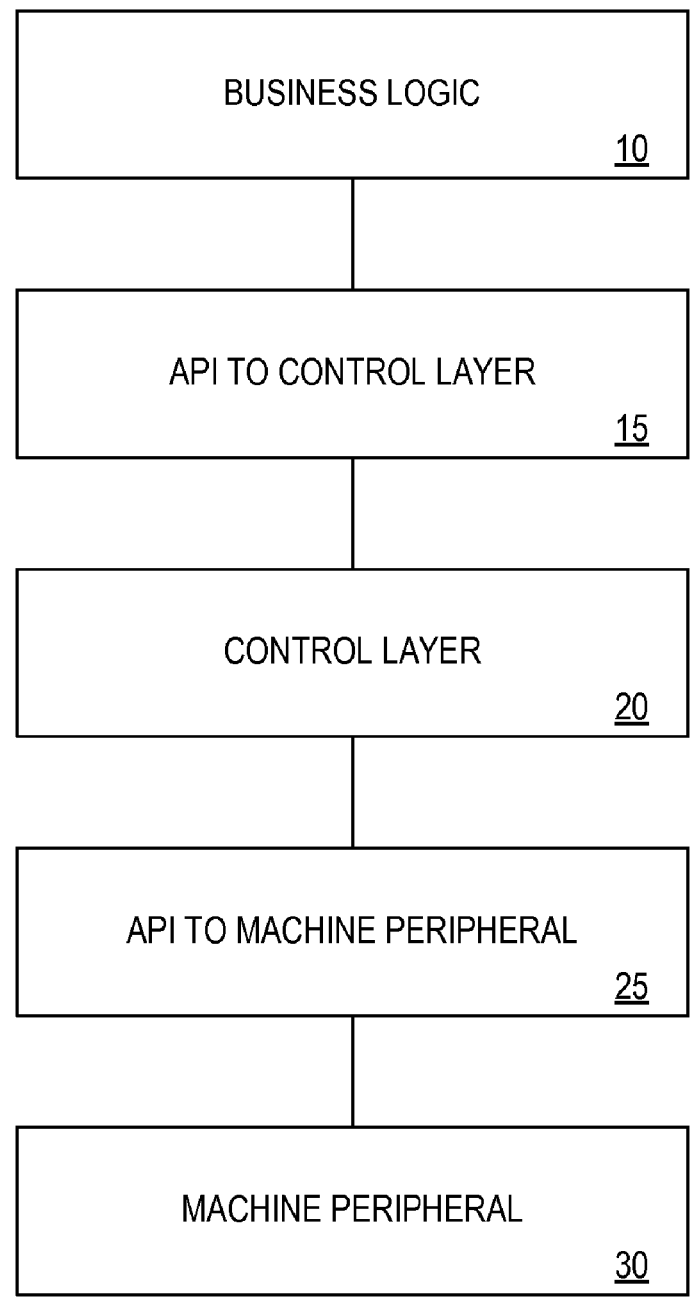
FIG. 1 depicts an embodiment of control software comprising abstract components.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, and 3G.

Where databases are described, it will be understood by one of ordinary skill in the art that (i) alternative database structures to those described may be readily employed, (ii) other memory structures besides databases may be readily employed.

DEFINITIONS AND EXEMPLARY USAGE OF CERTAIN TERMS

Actual Product Velocity, Actual Sales Rate—The actual rate at which a given product is sold by a vending machine during a sales period. The actual rate may be expressed in various forms, including units sold per time, sales revenue per time, and gross profit per time.

Component Product—a product, of which a unit may be sold (e.g., pursuant to an offer) along with at least one other unit of the same or another product.

Fill Period, Sales Period—The period of time between restock dates.

Full Price, Retail Price—In some embodiments, the price that is normally charged for the purchase of one unit of a given product when purchased alone, (i.e. not as a component product).

Ideal Product Velocity, Target Product Velocity, Ideal Sales Rate, Target Sales Rate, Target Velocity—The desired rate at which a given product should be sold by a vending machine during a period of time, such as a sales period. The desired rate can help achieve various goals, including a desired profit, sales, inventory level and/or amount of transactions. Moreover, such goals can be represented as, e.g., a value to be achieved by a certain time, or as a value averaged over a period of time. Thus, in some embodiments, an ideal velocity may be set or calculated for each inventoried product indicating the rate at which products must be sold in order to deplete the vending machine's inventory to a certain level by the end of a given sales period (i.e. by the restock time/date or an expiration time/date). For example, an ideal product velocity may be calculated by a vending machine control system after an operator inputs a restock date and a desired remaining inventory for the restock date (e.g. an operator may wish to have only one unit of each product remaining at the restock date so that the machine sells as many units as possible without completely selling out and thereby disappointing customers). Thus, if an operator (a) stocks 50 units of Soda A, (b) inputs a restock date fourteen days away, and (c) indicates that only one unit of Soda A should remain at the restock date, the control system may divide 49 by 14 to conclude that, on average, 3.5 units of Soda A must be sold per day within the sales period in order to realize the ideal product velocity. As discussed herein, a vending machine control system may periodically, substantially continuously, or otherwise evaluate the difference between a product or products' actual product velocity and ideal product velocity for the purpose of making package offer decisions (e.g. in proactive inventory grouping embodiments, determining which products to assign to a certain inventory group). The actual rate at which a given product should be sold may be expressed in various forms, including units of the product sold per time, sales revenue from sales of units of the product per time, and profit from sales of units of the product per time.

Income Contribution Factor, Profit Contribution Factor—A measure of the revenue or profit realized due to the sale of a particular product. In some embodiments, a product's income contribution factor may be defined by the total amount of revenue or the total amount of profit generated by the product during a certain time period (e.g. during a fill period, between certain dates, every twenty four hours). In other embodiments, a product's income contribution factor may be represented as a percentage, such as that which may be calculated by dividing the amount of profit generated by the product in a certain period of time by the total amount of profit generated by some or all products sold through the vending machine in the time period. For example, if a vending machine realized $100 in total profit during a fill period, and a certain product was responsible for generating $12 of the profit, that product's income contribution factor could be represented as the percentage '12%'. In some embodiments, an income contribution factor may be used for the purpose of determining how to allocate a product to one or more inventory groups.

Inventory Group, Package Group—A set of products. An inventory group may include a single product, or more than one product. In many embodiments, a customer may select a component product from an inventory group. In certain proactive inventory grouping embodiments, pursuant to a package offer, customers may select at least two component products, a component product selected from each of at least two inventory groups, for a single price. In reactive inventory grouping embodiments, pursuant to a package offer, customers may select a second component product from an inventory group that is revealed after a first component product is selected from a first inventory group. In one or more embodiments, inventory groups may be communicated to customers through colored LEDs located proximately to inventoried products (e.g. products in a "red" group may be communicated via proximately located red LEDs; products in a "green" group may be communicated via proximately located green LEDs). In proactive and reactive inventory grouping embodiments, inventory groups may be "reactively? Automatically?" determined by a vending machine control system during a sales period. In other embodiments, inventory groups are not determined reactively? Automatically? (as in proactive or reactive inventory grouping embodiments), but are rather determined prior to a sales period by an operator or other person, and are stored (e.g., as rules in a database) accessible to a vending machine control system.

Operator—The owner (or employee or agent thereof) of a vending machine.

Package Offer, Package Deal, Combination Deal, Combination Offer, Combination Product Offer, "Load-up" Deal, Value Combo Deal, Combo Deal—An offer enabling a customer to purchase at least two products. In many embodiments the at least two products are sold for a single price. In many embodiments, the two products are dispensed to the customer essentially simultaneously (e.g., within seconds of each other). Typically, package offers are configured so the price of the at least two products is less than the sum of the prices of the two products, and thus the customer saves money compared to the sum of the individual component products' retail prices.

Package Instance, Potential Package—A combination of specific component products according to a package offer. Thus, a package offer defines one or more (but typically many) package instances. In some embodiments, package instances are constructed and compared to other package instances for the purpose of determining which products may be made available for selection by a customer pursuant to a package offer. In some proactive inventory grouping embodiments, package instances are constructed and compared in order to determine how to apportion inventory between two inventory groups. In some reactive inventory grouping embodiments, package instances are constructed and compared in order to determine the composition of an inventory group from which a customer may select a second component product after a first component product has been selected.

Package Price—The price that is charged (typically in a single transaction) for the units of products purchased pursuant to a package offer. Typically, package prices reflect a net-savings to the customer when compared to the sum of the respective retail prices of the individual component products.

Product Cost, Item Cost, Cost—The cost to the operator of a unit of selling a given product. The product cost may reflect the fixed cost and/or the variable cost in selling a unit of the product. In some embodiments, stored rules may instruct a vending machine control system to not sell a product or products unless the cost of the product(s) is equal to or less than a certain price (e.g., a retail price, a package price). In other embodiments, stored rules may instruct a vending machine control system to sell a product or products even though the cost of the product or products is greater than a retail price or package price, as may be the case where the product or products' actual sales rates are above a certain threshold (e.g. where actual sales rates exceed target sales rates).

Product, Item—A good or service provided by (e.g., sold by, dispensed by, handled by) a vending machine. Examples of goods provided by vending machines include beverages (e.g. cans of soda) and snacks (e.g. candy bars).

Restock Date, Restock Time—The time and/or date that a vending machine is scheduled to be restocked by an operator (or agent thereof) of a vending machine.

Various embodiments, including products and processes, are disclosed for facilitating the sales of combinations of units of products. The disclosed embodiments are particularly suitable for use in one or more vending machines or like apparatus.

According to an embodiment, a vending machine or other apparatus is configured to increase sales and/or profitability through novel processing of sales data, cost data and/or other data available to the vending machine.

In particular, various embodiments allow groups of products to be defined according to various criteria. Customers are prompted to purchase products from the groups. Thus, appropriate definition of the groups can lead to benefits such as increased profits per time.

According to a "proactive inventory grouping" embodiment of the present invention, on a periodic, substantially continuous or event-triggered basis, sales and/or cost data is monitored and evaluated against stored rules for the purpose of determining how to apportion inventory among at least two inventory groups from which, pursuant to a package offer, a customer may select and purchase at least two products for a single price. In determining how to apportion inventory to the different inventory groups, a vending machine may consider a value rating of one or more products. For example, products having a relatively high value rating may be allocated to a first inventory group, while products having a relatively low value rating may be allocated to a second inventory group. Thereafter, package offers encouraging the purchase of at least two products (e.g., at least one product from each of at least two inventory groups) may be output to prospective customers through one or more output devices. For example, a scrolling light emitting diode (LED) display may read "Pick any item from the red group and any item from the green group for $1.00!", and shelf-mounted LED displays located adjacent to the various qualifying products may contemporaneously flash in red and/or green to indicate the products' inventory grouping statuses (i.e. green or red). The vending machine may be further configured to process package offer transactions in accordance with such advertised package offers by (i) receiving, through an input device, an indication of customer acceptance and (ii) dispensing a combination of products consistent with the advertised package offer.

According to a "reactive inventory grouping" embodiment, a customer is offered the ability to purchase a combination of products for a single price by the customer selecting a first product from a first group of inventoried products, and then the customer picking a second product from a second inventory group that is revealed to the customer after the first product is selected. In determining which inventoried products will be included in the second inventory group, a vending machine may consider a value rating of one or more products.

Further, according to some embodiments, a value rating of one or more products may be determined by considering one or more of (i) the time remaining until a restock date, (ii) the time remaining until an expiration date of a product or products, (iii) an actual sales rate of a product or products, (iv) a target or ideal sales rate of a product or products, (v) the cost of a product or products, (vi) the retail price of an individual unit of a product or products, (vii) the profit margin of a product or products at a given sale price such as the retail price, (viii) the historical acceptance rate of package instance comprising a given combination of products, and/or (ix) one or more products' income or profit contribution factor(s) (e.g., measures of one or more products' historic success in the marketplace).

I. Vending Machine Apparatus and System Architecture

A. Introduction

Generally, a vending machine according to various embodiments can include a device configured to manage sales transactions with customers by, among other things, receiving payment from customers, controlling the pricing and/or distribution of goods and/or controlling entitlements to services.

B. Machine Casing/Cabinetry

In some embodiments, suitable machine cabinetry may be constructed from any suitable material, including but not limited to any combination of (1) commercial grade sixteen-gauge steel (e.g. for exterior panels and internal shelving), (2) transparent materials such as glass or Plexiglas (e.g. for product display windows), (3) rubber (e.g. for waterproofing insulation), (4) plastic, and/or (5) aluminum.

Many commercially available machine casings can be adapted to work in accordance with various embodiments. For example, in snack machine embodiments, a suitable machine casing may comprise the 129 SnackShop manufactured by Automatic Products International, Ltd. of Saint Paul, Minn., which stands at 72"/1829 mm wide, has a width of 38⅞"/988 mm, and a depth of 35"/889 mm. Other suitable snack machine casings include the A La Carte® machine from Automatic Products, and the GPL SnackVendor model # 159 from Crane Merchandising Systems/Crane Co. of Stamford, Conn.

In beverage machine embodiments, machine casings commercially available from Dixie Narco, Inc. of Williston, S.C. may be employed. Beverage machine casings may comprise a "cooler" or "glass front" style front panel, featuring a transparent front panel (e.g. glass) enabling customers to see inventory for sale. Alternatively, beverage machine casings may comprise a "bubble front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co. Further details concerning the suitability of machine casing/cabinetry are well known in the art, and need not be described in further detail herein.

C. Inventory Storage and Dispensing Mechanisms

Inventory storage and distribution functions of a vending machine configured in accordance with a snack machine embodiment of the present invention may include one or more conventional components, including: (i) a drive motor, (ii) metal shelves, (iii) a product delivery system (e.g. a chute, product tray, product tray door, etc.), (iv) dual spiral (i.e. double helix) product dispensing rods, (v) convertible (i.e. extendable) shelves, and/or (vi) a refrigeration unit. In embodiments using the casing of the model 129 SnackShop manufactured by Automatic Products, 3 removable shelves may be employed, together providing for 30 product rows and an inventory capacity of between 185 to 522 commonly vended snack products.

Inventory storage and distribution functions of a vending machine configured in accordance with a beverage machine embodiment of the present invention may include one or more conventional components, including: (i) metal and/or plastic shelving, (ii) product dispensing actuators/motors, (iii) product delivery chutes, and/or (iv) a refrigeration unit.

In many types of beverage and snack vending machines, operators will typically stock several units of the same product linearly arranged in a column, allowing individual units to be dispensed upon command. The same product may be stocked in more than one column. Similarly, more than one product may be stocked in a single column. Examples of services sold by vending machines include car washes, photography services and access to digital content (e.g. permitting the downloading of MP3 files to a handheld device).

Further details concerning vending machine inventory storage and dispensing mechanisms are well known in the art, and need not be described in further detail herein.

D. Payment Processing Mechanisms

The vending machine may also include one or more mechanisms for receiving payment and dispensing change, including a coin acceptor, a bill validator, a card reader (e.g. a magnetic stripe reader) and a change dispenser.

In a manner known in the art, a magnetic stripe card reader may read data on the magnetic stripe of a credit or debit card, and it may cooperate with conventional point-of-sale credit card processing equipment to validate card-based purchases through a conventional transaction authorization network. Suitable card-based transaction processing systems and methods are available from USA Technologies, Inc.

The coin acceptor, bill validator and change dispenser may communicate with a currency storage apparatus (a "hopper") and may comprise conventional devices such as models AE-2400, MC5000, TRC200 by Mars, Inc. of West Chester, Pa., or CoinCo model 9300-L. The coin acceptor and bill validator may receive and validate currency that is stored by the currency storage apparatus. The change dispenser activates the return of coinage from the currency storage apparatus to the customer where appropriate (e.g. where a customer deposits more currency than is required for a given transaction). Such apparatus may feature Multidrop Bus (MDB) and/or Micromech peripheral capabilities, as is known in the art.

In another embodiment, a vending machine according to various embodiments may be configured to receive payment authorization and product selection commands through a wireless device communication network, directly or indirectly, from a customer's wireless device (e.g. a cellular telephone). In such an embodiment, a payment processing mechanism may comprise a cellular transceiver operatively connected to a processor, as described herein. Systems and methods allowing for the selection of and payment for vending machine articles through cellular telephones are provided by USA Technologies, Inc., of Wayne, Pa. Further, in such an embodiment, a cellular telephone may serve as an input/output device, as described herein.

Further details concerning vending machine payment processing mechanisms are well known in the art, and need not be described in further detail herein.

E. Input/Output Devices

According to various embodiments, a vending machine may include an input device for receiving input from (i) a customer indicating a product and/or offer selection, and/or (ii) an operator (or agent thereof) during stocking or maintenance of the vending machine. Also, a vending machine may include one or more output devices for outputting product or offer information to a customer or operator.

Many combinations of input and output devices may be employed according to various embodiments. In some embodiments, a vending machine may include more than one input device. For example, vending machine may include an exterior input device for receiving customer input and an interior input device for receiving operator input. In some embodiments, however, the input device provides the dual functionality of receiving input data from both operators and customers. Likewise, a vending machine may comprise more than one output device (e.g. an LCD screen and several LEDs, as described herein). However, in some embodiments, such as those which feature touch screens (described herein), input and output functionality may be provided by a single device.

Many types of input devices are contemplated. Thus, an input device may comprise one or more of (1) a set of alphanumeric keys for providing input to the vending machine, such as the Programmable Master Menu® Keypad, (2) a selector dial, (3) a set of buttons associated with a respective set of product dispensers, (4) a motion sensor, (5) a barcode reader, (6) a voice recognition module, (7) a Dual-Tone Multi-Frequency receiver/decoder, (8) a wireless device (e.g. a cellular telephone or wireless Personal Digital Assistant), and/or (9) any other conventional input device commonly employed by a vending machine designer.

Likewise, many types of output devices are contemplated. For example, an output device may comprise a Liquid Crystal Display (LCD). Alternatively or additionally, an output device may also comprise one or more Light Emitting Diode (LED) displays (e.g. several alphanumeric multi-color or single color LED displays on the shelves of a vending machine associated proximately with each row of product inventory).

In one embodiment, an LED display screen is mounted atop the vending machine (via bolts or other mounting hardware) and is used to communicate offers and other messages (e.g. product advertisements) to prospective customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g. red, yellow, green, black) regarding current and upcoming promotions.

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. ranging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly.

As stated, in some embodiments, a touch-sensitive screen may be employed to perform both input and output functions. Suitable, commercially available touch screens for use according to various embodiments are manufactured by Elo TouchSystems, Inc., of Fremont, Calif., such as Elo's AccuTouch series touch screens. Such touch screens may comprise: (i) a first (e.g. outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use according to various embodiments may be resistant to environmental stressors such as water, humidity, chemicals, electrostatic energy, and the like. These and other operational details of touch screens (e.g. drive current, signal current, capacitance, open circuit resistance, closed circuit resistance, etc.) are well known in the art and need not be described further herein.

F. Logic/Control/Processing Apparatus

The components of the vending machine, including the input device, output device, coin acceptor, bill validator, card (e.g. magnetic stripe) reader, change dispenser, currency storage apparatus, and product dispensing mechanism(s) (collectively, the "peripherals") communicate with, and are controlled by, a control system or processor, such as one based on the Intel® Pentium® or Centrino™ series processor. The processor may be in communication with a memory and a communications port (e.g., for communicating with one or more other computers or vending machines). The memory may comprise non-volatile media and/or volatile media, such as an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver.

A memory may store a program for controlling a processor. The processor performs instructions of the program, and thereby operates according to various embodiments, and particularly in accordance with the processes described in detail herein. The program may be stored in a compressed, uncompiled and/or encrypted format. The program furthermore includes program elements that may be necessary or desirable, such as an operating system, a database management system and "device drivers" for allowing the processor to interface with the peripherals. Appropriate program elements are known to those skilled in the art, and need not be described in detail herein.

According to an embodiment of the present invention, the instructions of the program may be read into a main memory from another computer-readable medium, such as from a ROM or hard disk. The execution of sequences of the instructions in a program causes the processor to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory also may store one or more databases. Some or all of the data stored in each database is described herein. The described data represents exemplary information only; those skilled in the art will understand that the number, content, and form of the data can be different from that which is described herein without departing from the spirit and scope of the invention. Further, despite any description of the databases as tabular, relational databases, an object-based model could be used to store and manipulate the data types of various embodiments and likewise, object methods or behaviors can be used to implement the processes of various embodiments.

Thus, the machine's processing apparatus, in conjunction with the peripherals (e.g. through RS232 connections and/or other suitable connections), manages interactions with the user in accordance with stored business logic, described herein.

G. Retrofitting Conventional Vending Machines with a Separate Device

In one embodiment, one or more of the processor, the input device(s), RAM, ROM, output device(s) and a data storage device may be included, wholly or partially, in a separate device, such as the e-Port™ by USA Technologies Inc., that is in communication with a vending machine. The separate device may also be in communication with a network such as the Internet.

The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., offers and information about their transaction status.

The separate device may alternatively be a programmed computer running appropriate software for performing various functions described herein. The separate device may be operable to receive input from customers, receive payment from customers, exchange information with a remotely located server and/or display messages to customers (e.g. package offer content). The separate device may be operable to instruct the vending machine that appropriate payment has been received (e.g., via a credit card read by the separate device) and/or that a particular product or products should be dispensed by the vending machine. Further, a separate device may be operable to instruct the vending machine to execute package promotions, price changes, or the like.

Thus, a separate device may be operatively connected to a vending machine to perform the inventive processes described herein. In this manner, conventional vending machines may be retrofitted with such separate devices so as to perform the inventive processes described herein.

H. Network Embodiments

Various embodiments may be configured to operate in a network environment including a computer that is in communication, via a communications network, with one or more vending machines. The computer may communicate with the vending machines directly or indirectly, via a wired or wireless medium such as the Internet, LAN, WAN or Ethernet, Token Ring, or via any appropriate communications means or combination of communications means. Each of the vending machines may comprise computers, such as those based on the Intel® Pentium® or Centrino™ processor, that are adapted to communicate with the computer. Any number and type of machines may be in communication with the computer.

Communication between the vending machines and the computer, and among the vending machines, may be direct or indirect, such as over the Internet through a Web site maintained by computer on a remote server or over an on-line data network including commercial on-line service providers, bulletin board systems and the like. In yet other embodiments, the vending machines may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that vending machines and/or computers in communication with each other need not be continually transmitting to each other. On the contrary, such vending machines and/or computers need only transmit to each other as necessary or desirable, and may actually refrain from exchanging data most of the time. For example, a vending machine in communication with another machine via the Internet may not transmit data to the other machine for weeks at a time.

In an embodiment, a server computer may not be necessary or desirable. For example, various embodiments may be practiced on a stand-alone vending machine and/or a vending machine in communication only with one or more other vending machines. In such an embodiment, any functions described as performed by the server computer or data described as stored on the server computer may instead be performed by or stored on one or more vending machines.

In other embodiments, a vending machine may be in communication with a remote computer, such as a server, that provides the vending machine with and/or receives from the vending machine, e.g., all or some of the data described herein. Thus, in certain embodiments, the server may comprise certain elements or portions of certain elements such as a data storage device/memory.

In such an embodiment, the remote computer could be accessible, directly or indirectly, via a second computer (communicating over the Internet or other network) by a customer or operator. Accordingly, a customer or operator of the second computer could communicate with the remote computer via a Web browser. The second computer could, e.g., receive from the remote computer messages described herein as being output by the vending machine, and/or transmit to the remote computer input described herein as being provided to the vending machine. Similarly, various data described herein as received through an input device of a vending machine may be received through a Web browser communicating with a remote server, which in turn communicates with the vending machine. Thus, an operator of the vending machine may have remote polling and reporting capabilities, may be able to transmit new business rules to the vending machine, and the like.

II. Vending Machine Logic: Stored Rules, Data and Associated Process Steps

A. General Software Architecture

B.

An exemplary software architecture suitable for practicing various embodiments of the invention is disclosed. Based on the present disclosure, those of ordinary skill in the art will readily employ many other architectures that are within the scope of the present invention.

In one embodiment, a software-based control system executes instructions for managing the operation of the vending machine, and in particular in accordance with the inventive functionality described herein. Such vending machine operations include, but are not limited to: (1) product pricing (e.g. displaying prices via an LED, changing such prices where appropriate, etc.), (2) processing sales transactions by (i) receiving one or more product selection from a customer, (ii) processing appropriate payment via a payment processing mechanism, and/or (iii) actuating corresponding product dispensing mechanisms, (3) identifying package offers, (4) outputting package offers to customers via output devices (including display of graphics/content on LCD and LED displays), and/or (5) recording transaction information (inventory levels, acceptance rates for package offers, etc.).

In some embodiments, machine peripherals (e.g. machine hardware, including mechanical hardware such as input devices, output devices, inventory dispensing mechanisms, and payment processing mechanisms including coin acceptors, bill validators, card readers, change dispensers, etc.) will be controlled by the software-based control system through a standard RS-232 serial interface. In such embodiments, embedded APIs (Application Program Interfaces) and/or devices may be used to enable the software to actuate/control vending machine peripherals via RS-232 connectivity. Such vending machine peripherals may be operatively connected to the control system directly or indirectly, in any manner that is practicable.

As illustrated by FIG. 1, in one embodiment the control software that directs the control system can be divided into three abstract components. Such division may provide a clear partition of tasks, which may be desirable so that any future modification and new programming of one component can be applied without disrupting other components. Such division also permits certain details of a component to be safely ignored by other components. In FIG. 1 the three abstract components are illustrated, including a Business Logic component 10, a Control Layer component 20, and an exemplary Machine Peripheral component 30. As stated earlier, any number of machine peripherals may be employed. The Business Logic component 10 is connected to Control Layer component 20 via API 15; Control Layer component 20 is connected to Machine Peripheral component 30 via API 25.

In one embodiment the Business Logic component 10 visually represents the portion of the software that selects promotional instances and configures offers, as discussed herein. Such a component may access a rules database and an inventory database to perform such functions. The Control Layer component 20 visually represents the portion of the software which interfaces with at least one Machine Peripheral component 30, and thereby transmits commands to perform such functions as: (i) outputting offer information via an output device (i.e. a Machine Peripheral component 30), (ii) dispensing products via a product dispensing mechanism (i.e. a Machine Peripheral component 30), and/or (iii) dispensing change due to a customer via a payment processing mechanism, which may include a change dispenser and a currency storage apparatus (i.e. several Machine Peripheral components 30). As stated, the Machine Peripheral component 30 generally represents machine hardware, including mechanical hardware such as input devices, output devices, inventory dispensing mechanisms, and payment processing mechanisms including coin acceptors, bill validators, card readers, change dispensers, etc.

Notwithstanding the embodiment of FIG. 1, those of ordinary skill in the art will readily recognize that the control software may be abstractly represented in many, nonexclusive manners. Further, software may be developed and/or represented according to many well-known paradigms besides a "layered" paradigm.

B. Package Offer Rules and Execution Thereof

1. General Description

Applicants have recognized many effects that, when exploited according to many disclosed embodiments, can significantly increase the profit per time period realized by a vending machine. Applicants have recognized that by, for example, selling products at a lower margin, but at a higher velocity or volume, the overall profitability of a vending machine can be increased. Accordingly, in some embodiments, the vending machine may define, output and process package offers enabling customers to purchase a combination of products (from one or more vending machines) for a single price.

By encouraging the sale of at least two products (particularly for a single price, for a discounted price, or with a single payment) according to various disclosed embodiments, both vending machine operators and customers can benefit.

As customers are encouraged, through package offers, to purchase more products than they otherwise would, operators can benefit through increased sales volume. Operators further can benefit from the increased profitability (e.g., per time period, per transaction, per customer interaction) that results when such increases in sales volume sufficiently offset any discount from the packaged products' individual retail prices. Additionally, operators may economically configure machines to accept alternative payment forms that have higher transaction costs (e.g. credit cards) than conventional payment forms (e.g. cash) because of the higher per-transaction revenue and profit that results from selling combinations of products. Such alternate payment forms can prompt customers to spend more than they would have spent otherwise.

Customers can benefit through (i) the net-savings that often results when package prices are compared to the sum of the individual component products' retail prices, and/or (ii) the added convenience gained from the ability to purchase several products in a single transaction. Further, as vending machines may be configured to economically offer alternate payment forms, customers may benefit from the flexibility provided by an increased number of payment options.

2. Process Steps of Various Embodiments

According to some embodiments, a memory stores instructions that, when executed by a processor, direct a vending machine or other apparatus to identify, output and/or process package offers.

Several embodiments of advantageous processes are described below to illustrate the wide breadth of the disclosed invention. Many of the embodiments below are described as being performed wholly by a vending machine. However, it will be readily apparent to one of ordinary skill in the art that these processes may be performed, in whole or part, by a vending machine, by components of a vending machine, and/or by a device in communication with a vending machine.

Further, although the description herein refers to a vending machine as dispensing units of products, a plurality of vending machines may cooperate to provide units of products. Typically, more than one vending machine may be employed to provide units of different types of products (e.g., a first vending machine which sells snack food and a second vending machine which sells carbonated beverages).

Although one or more embodiments are described herein as enabling the sale of packages comprising two component products, it should be understood that package offers may provide for the sale of any number of component products, including three, four and five component products.

According to one embodiment, a vending machine defines at least one inventory group, which includes at least two products that are available for sale by the vending machine. For example, the vending machine may define an inventory group that includes three specific products (e.g., Snickers® candy bar, Milky Way® candy bar and Twix® candy bar). The vending machine may define an inventory group by storing appropriate data in a database or other memory structure. For example, the Table immediately below discloses one manner of defining an inventory group.

TABLE 1

Example Definition of an Inventory Group

| Inventory Group Identifier | Products Included in the Inventory Group |
|---|---|
| G001 | P34 |
| G001 | P35 |
| G001 | P17 |
| G001 | P22 |

In the Table above, the group identified by code "G001" includes the four products identified by codes P34, P35, P17 and P22, respectively. One of ordinary skill in the art will readily understand any other ways to define an inventory group.

In an embodiment, an inventory group may include one or more products. Furthermore, in an embodiment, a product may be included in more than one group. Furthermore, in an embodiment, a product may be included in no group.

For example, in an embodiment, the vending machine defines at least two inventory groups, and each of the at least two inventory groups includes at least one respective product that is available for sale.

As described in detail herein, there are many ways to advantageously determine which products are included in which groups.

According to an embodiment, the vending machine outputs an indication of products that the at least one inventory group includes. For example, in an embodiment the vending machine may control an output device to communicate (e.g., to a potential customer near the vending machine) the products that the at least one inventory group includes. When there is more than one inventory group, the vending machine may output, for each of the inventory groups, an indication of products that the respective inventory group includes.

If employed, an output device may comprise a flat panel monitor, cathode ray terminal (CRT), liquid crystal display (LCD) or a like device that displays text and/or images (e.g., still graphics, animated graphics) as directed by the vending machine (e.g., that a group includes "any candy bar" or "anything in the top row"). Alternatively or additionally, the output device may comprise an audio output device such as a speaker that is operated by the vending machine to output the appropriate sounds (e.g., synthesized sound, pre-recorded sound), typically verbal instructions/offers to potential customers. Sounds may be output with reference to one or more data files (e.g., wave tables, MP3 files).

Alternatively or additionally, the output device may comprise a plurality of colored lighting devices (e.g., LEDs, light bulbs, LCD panels), in which each colored lighting device is located proximate to one product column. The vending machine could selectively illuminate the plurality of colored lighting devices to indicate the products that a particular inventory group includes. For example, each product column may have proximate thereto a pair of LEDs, each a different color (e.g., red and green respectively). To indicate the products that a first inventory group includes, the vending machine could illuminate only the red LEDs that are proximate to the product columns of those included products. To indicate the products that a second inventory group includes, the vending machine could similarly illuminate the appropriate green LEDs.

Several variations may be readily made to the above-described method for indicating an inventory group. For example, each product column may include more than two LEDs. Similarly, each product column could include a single LED that is capable of displaying more than one color, or otherwise indicating more than one inventory group, as directed by the vending machine.

In an embodiment, the products that are included in an inventory group may be indicated by any means for denoting product columns. For example, a sticker, sign, flag or the like could be applied to certain product columns to indicate that the products of that column are included in an inventory group.

In an embodiment, the products that are included in an inventory group may be indicated by any means of communicating product information to a customer. For example, a sign (e.g., located atop a vending machine) or advertising (displayed or communicated to the customer in any manner whether or not proximate to the vending machine) may inform a customer that an inventory group includes, e.g., all products of a certain type (e.g., candy bars, snack food, Mars® products), all products of a certain location (all products in the top row of the vending machine, any product from the right hand vending machine of a connected pair of vending machines, any product in any machine on the fourth floor of a building) and/or certain products by name (e.g., a Snicker's® candy bar).

In some embodiments, the indication of inventory groups may be advantageously combined with the provision of an offer to the customer. For example, the vending machine may provide, to the customer, an offer to sell to the customer, for one predetermined price, (i) at least one unit of any product that is included in a first inventory group, and (ii) at least one unit of any product that is included in a second inventory group.

As is well known, offers may be output via many types of devices, such as via a flat panel monitor, cathode ray terminal (CRT), liquid crystal display (LCD) or a like device that displays text and/or images as directed by the vending machine (e.g., that a group includes "pick any candy bar and any beverage"). Alternatively or additionally, the output device may comprise an audio output device such as a speaker that is operated by the vending machine to output the appropriate sounds (e.g., synthesized sound, pre-recorded sound), typically verbal instructions/offers to potential customers. Sounds may be output with reference to one or more data files.

In an embodiment, an offer may be provided by any means for communicating information to a customer. For example, a sign (e.g., located atop a vending machine) or advertising (displayed or communicated to the customer in any manner whether or not proximate to the vending machine) may include an offer to sell to the customer, for one predetermined price, (i) at least one unit of any product that is included in a first inventory group (e.g., all candy bars), and (ii) at least one unit of any product that is included in a second inventory group (e.g., all products in a second vending machine).

The offer may be provided at various times. For example, the offer may be provided in response to receiving payment or receiving any input (e.g., a touch screen has been pressed). Alternatively or additionally, an offer may be provided after receiving a first selection of a product but before receiving a second selection of a second product.

The offer is particularly enticing, and thus is more likely to be accepted, if the offer provides the customer with a discount or other benefit. For example, the vending machine could provide, to the customer, an offer to sell to the customer, for one predetermined price, (i) one unit of any product that is included in a first inventory group, and (ii) one unit of any product that is included in a second inventory group. The predetermined price could reflect a discount over the retail prices of the component products. In other words, the predetermined price could be less than the sum of (a) a price of one unit of any product that is included in the first inventory group, and (b) a price of one unit of any product that is included in the second inventory group.

An "acceptance" of an offer may include payment and/or selection of product(s) which correspond to the offer.

According to an embodiment, the vending machine may receive from a customer (whether or not in response to an offer) a selection of a first product that the at least one inventory group includes. For example, the vending machine may indicate that all candy bars are included in a first inventory group, and a customer may in response indicate that select a Snickers® candy bar (which the first inventory group includes).

In an embodiment, the vending machine may receive, from a customer, a selection of (i) a first product that one of the inventory groups includes, and (ii) a second product that another one of the inventory groups includes.

In such an embodiment, the selection of products may be received simultaneously (e.g., "pressing a single button"). Alternatively, the vending machine may receive, from the customer, a first selection of a first product, and then a second selection of a second product.

As is well known, selection of products may be made in many ways. Customers may press certain combinations of buttons (e.g., "A1" indicates a particular product column, so the customer may press an "A" button and then press a "1" button on the vending machine). Such buttons may be physical buttons (e.g., composed of plastic and appropriately in communication with a processor of the vending machine). Such buttons may additionally or alternatively be "soft buttons" (e.g., graphically displayed on a touch-screen device, and responsive to pressure resulting from the customer pressing the appropriate areas of the touch screen). Many other ways of selecting one or more products are readily understood by one of ordinary skill in the art.

According to an embodiment, the vending machine may process a sale of (i) a unit of the first product selected by the customer, and (ii) a respective unit of at least one additional product, for a single price. In processing the sale, the vending machine will typically await sufficient payment, dispense the appropriate units of the appropriate products, and/or provide change if any change is due the customer.

The at least one additional product may have been explicitly selected by the customer, for example, by pressing appropriate buttons that indicate the additional product(s). Additionally or alternatively, the at least one additional product may have been selected "for" the customer in various manners. For example, the at least one additional product may be a product which is, by default, added to an order by a customer. In another embodiment, the at least one additional product may be offered to a customer ("would you like a stick of gum for an extra ten cents?") and "selected" by the customer when the customer accepts the offer (e.g., pressing an "OK" button).

According to an embodiment, the vending machine may process a sale of a unit of the first product and a unit of the second product upon receiving from the customer one payment of at least a predetermined price. For example, the vending machine may receive from the customer a single payment (e.g., a dollar bill is inserted, a credit card account is charged) which constitutes the predetermined price. Alternatively, the vending machine may receive from the customer a single payment which exceeds the predetermined price. The vending machine would typically provide change to the customer in such a situation.

In addition to the features and embodiments described above, it is highly advantageous to define inventory group(s) according to various processes and/or utilizing various information. Accordingly, many embodiments for defining inventory groups are described in detail immediately below.

PROACTIVE INVENTORY GROUPING EMBODIMENTS

In "proactive inventory grouping" embodiments, various data (e.g., product sales data, product cost data) may be employed to determine how to apportion inventory among inventory groups (typically at least two inventory groups) before a customer selects any product. After the apportioning of products to inventory groups is complete, package offers encouraging the purchase of at least two products from at least two inventory groups may be output by a vending machine to prospective customers.

Of course, steps performed in a proactive inventory grouping embodiment does not imply that those steps may only be performed in a proactive inventory grouping embodiment.

A proactive inventory grouping process by which one or more inventory groups are each defined to include one or more respective products may be initiated periodically, substantially continuously or after an event (e.g., a transaction, a restocking, a power-up). It can be desirable that customers throughout each day will receive the same ability to purchase products from the same inventory groups (e.g. one customer will not be offered the ability to select products from a more or less favorable inventory grouping than that which was provided to another customer that day). Thus, in embodiments where the process is initiated periodically, it may be desirable to set the time interval between process executions (i.e. defining inventory groups) so that the process is executed at convenient times (e.g., every 24 hours starting at midnight).

Alternatively or additionally, in embodiments where the process is executed after a triggering event such as a transaction with a customer, it may be desirable that the process is initiated a number of minutes after a transaction, when no intervening transaction has been processed (e.g. the process is initiated 30 minutes after a transaction, provided no intervening transaction has been consummated). In this manner, it may be safe to assume that the machine is experiencing a lull in sales, and that customers accordingly may not witness any change of inventory groupings/apportionments (i.e. a customer is unlikely to walk up to the machine and witness any reallocation of inventory from a "red" group to a "green" group).

Figure 2:
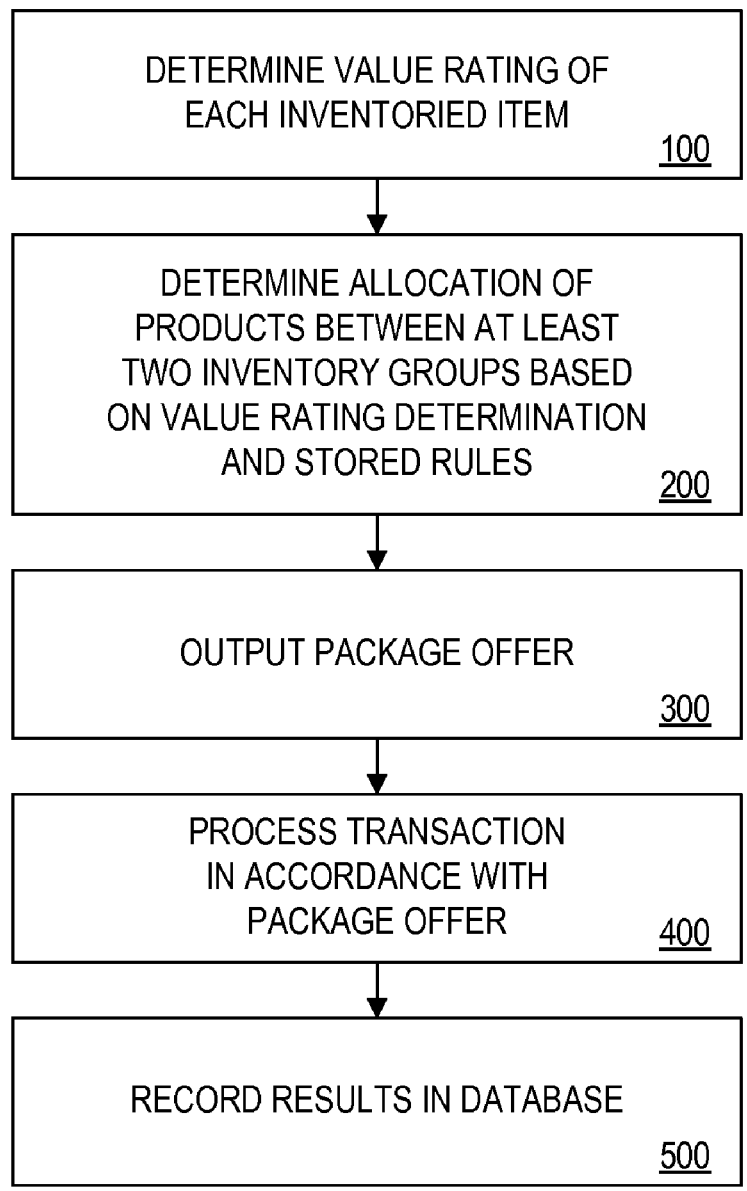
FIG. 2 illustrates an embodiment of a proactive inventory grouping embodiment.

According to one proactive inventory grouping embodiment, which is illustrated by FIG. 2, the illustrated proactive inventory grouping process functions to, among other things, allocate products available for sale to inventory groups based on (1) the relative value ratings of the products, and (2) stored rules for determining, among other things, whether products should be included in package offers. A description of the steps of FIG. 2, which provides a flow chart for such a proactive inventory grouping process, follows:

Step 100: Determine Value Rating of Each Inventoried Item.

At Step 100, the vending machine may determine a value rating of products by, for example, accessing an inventory database to determine, among other things, products in inventory and characteristics thereof.

The value ratings of products may be used to determine the products which various inventory groups include. For example, each product that a first inventory group includes may have a rating that is not less than a rating of any product that the second inventory group includes. As another example, a first inventory group may include a certain portion of the highest rated products (e.g., the products with the five highest value ratings; the highest 50%, by value rating, of all products).

The Table immediately below describes an example inventory database:

TABLE 2

Example Inventory Database

| Product Name | Row Position Identifier | Product Category | Retail Price | Cost | Margin | Quantity at Beginning of Fill Period | Quantity Remaining | Restock Date | Actual Sales Rate | Ideal Sales Rate |
|---|---|---|---|---|---|---|---|---|---|---|
| Coca-Cola ® | A1 | Beverage | $.75 | $.35 | $.40 | 20 | 8 | Jun. 30, 2003 | 1.2/day | 1.3/day |
| Diet Coke ® | A2 | Beverage | $.75 | $.30 | $.45 | 20 | 6 | Jun. 30, 2003 | 1.4/day | 1.3/day |
| A&W Root Beer ® | A3 | Beverage | $.65 | $.35 | $.30 | 20 | 9 | Jun. 30, 2003 | 1.1/day | 1.3/day |
| Doritos ® | B1 | Snack | $.50 | $.30 | $.20 | 25 | 11 | Jun. 30, 2003 | 1.4/day | 1.6/day |
| Lay's ® Potato Chips | B2 | Snack | $.75 | $.30 | $.45 | 25 | 7 | Jun. 30, 2003 | 1.8/day | 1.6/day |
| Cheetos ® | B3 | Snack | $.60 | $.30 | $.30 | 25 | 17 | Jun. 30, 2003 | 0.8/day | 1.6/day |
| Double-Mint ® | C1 | Chewing Gum | $.35 | $.20 | $.15 | 40 | 18 | Jun. 30, 2003 | 2.2/day | 2.6/day |
| Juicy Fruit ® | C2 | Chewing Gum | $.35 | $.20 | $.15 | 40 | 23 | Jun. 30, 2003 | 1.7/day | 2.6/day |
| Dentyne ® | C3 | Chewing Gum | $.40 | $.20 | $.20 | 40 | 36 | Jun. 30, 2003 | 1.1/day | 2.6/day |

As the above inventory database illustrates, for each product, a corresponding product category, retail price, cost, margin, quantity at the beginning of the fill period, quantity remaining as of the current date/time, restock date, actual sales rate and ideal sales rate. The data stored by such a database may be entered by an operator (e.g., who restocks the vending machine), determined by the vending machine with its peripheral devices (e.g., data indicating that a product has been sold, that an amount of money has been received), set randomly, and/or calculated from available data (e.g., other data stored by the inventory database or another database).

The exemplary data in the above inventory database assumes that the beginning of the fill period was Jun. 15, 2003, and that the current date is Jun. 25, 2003 (i.e. 10 days into the fill period). Further, the exemplary data in the above inventory database will be referred to throughout the remaining discussion of this process to illustrate steps of the example proactive inventory grouping embodiment in which the value rating of individual products are considered. For the purpose of this ongoing example, it shall be assumed that a package offer to a customer will define two products which may be purchased together for $1.00, in which one product is included in a first ("green") inventory group, and one product is included in a second ("red") inventory group.

At Step 100 of FIG. 2, a value rating is determined for each inventoried product. There are many ways that value ratings could be represented and many ways that value ratings could be determined.

A value rating may be represented as a numerical quantity, a set of numerical quantities (e.g. a vector, a matrix), or any other quantity that may be used for purposes of comparison and/or evaluation. A value rating may also be qualitative, such as "high", "medium", or "low". In one or more embodiments, the value rating of one or more products may be determined by considering one or more of (i) the time remaining until a restock date, (ii) the time remaining until an expiration date of a product or products, (iii) an actual sales rate of a product or products, (iv) a target or ideal sales rate of a product or products, (v) the cost of a product or products, (vi) the retail price of an individual unit of a product or products, (vii) the retail profit margin of a product or products when sold for the retail price, (viii) the historical acceptance rate of a package instance comprising a given combination of products, and/or (ix) one or more products' income or profit contribution factor(s).

Thus, a value rating may be determined using a formula in which any of the above criteria (i) through (ix) may serve as variables. For example, in one embodiment, a value rating is determined by identifying a product's retail profit margin (as determined by subtracting the product's cost from the product's retail price). For example, following the exemplary data in the above inventory database, the vending machine control system would determine that a Diet Coke® soda has a margin of $0.45. The value rating of each product margin may be that product's margin, some proportion of the margin, or some other variation of the margin.

In another embodiment, value ratings may be determined by multiplying a product's margin by its actual sales rate expressed as a percentage of the product's ideal sales rate. By using a product's actual sales rate as a basis for predicting future sales, the vending machine control system can determine the likelihood (e.g. as a percentage) that the particular product will sell at the product's ideal sales rate. In turn, by multiplying this percentage by the product's margin, a value rating can be determined. (Note, however, at the beginning of a fill period, a vending machine may determine a product's sales rate to be zero, as no sales data for that period has yet been collected, or may determine the product's sales rate based on data obtained from a prior fill period.) The table immediately below illustrates such an embodiment in the context of the ongoing example. In the illustrated embodiment, the value rating of each product (as described above in the inventory database) is calculated by multiplying each product's margin by a percentage that reflects the product's actual sales rate divided by the product's ideal sales rate:

TABLE 3

Values calculated based on Actual and Desired Sales Rates

| Product | Margin | Actual Sales Rate | Ideal Sales Rate | Actual Sales Rate as percent of ideal sales rate | Value Rating |
|---|---|---|---|---|---|
| Coca-Cola ® | $.40 | 1.2/day | 1.3/day | 92% | $.37 |
| Diet Coke ® | $.45 | 1.4/day | 1.3/day | 107% | $.48 |
| A&W Root Beer ® | $.30 | 1.1/day | 1.3/day | 85% | $.26 |
| Doritos ® | $.20 | 1.4/day | 1.6/day | 88% | $.18 |
| Lay's ® Potato Chips | $.45 | 1.8/day | 1.6/day | 113% | $.51 |
| Cheetos ® | $.30 | 0.8/day | 1.6/day | 50% | $.15 |
| Double-Mint ® | $.15 | 2.2/day | 2.6/day | 85% | $.13 |
| Juicy Fruit ® | $.15 | 1.7/day | 2.6/day | 65% | $.10 |
| Dentyne ® | $.20 | 1.1/day | 2.6/day | 42% | $.08 |

In various embodiments, products can be scored, sorted and/or ranked based on their relative value ratings, and such data can be stored in RAM pending Step 200, below, at which point the scoring, sorting and/or ranking may be considered in the allocation of products to inventory groups. Thus, following the ongoing example (in which the value rating of each product in the above inventory database was calculated by multiplying each product's margin by its actual sales rate as a percentage of its ideal sales rate), inventoried products can be sorted in descending order based on their relative value ratings, as illustrated by the table immediately below:

TABLE 4

Values calculated based on Actual and Desired Sales Rates

| Product | Margin | Actual Sales Rate | Ideal Sales Rate | Actual Sales rate as percent of ideal sales rate | Value Rating |
|---|---|---|---|---|---|
| Lay's ® Potato Chips | $.45 | 1.8/day | 1.6/day | 113% | $.51 |
| Diet Coke ® | $.45 | 1.4/day | 1.3/day | 107% | $.48 |
| Coca-Cola ® | $.40 | 1.2/day | 1.3/day | 92% | $.37 |
| A&W Root Beer ® | $.30 | 1.1/day | 1.3/day | 85% | $.26 |
| Doritos ® | $.20 | 1.4/day | 1.6/day | 88% | $.18 |
| Cheetos ® | $.30 | 0.8/day | 1.6/day | 50% | $.15 |
| Double-Mint ® | $.15 | 2.2/day | 2.6/day | 85% | $.13 |
| Juicy Fruit ® | $.15 | 1.7/day | 2.6/day | 65% | $.10 |
| Dentyne ® | $.20 | 1.1/day | 2.6/day | 42% | $.08 |

In embodiments where value ratings of products are determined based on profit contribution factors, such products might be ranked or sorted according to their relative profit contribution percentages. For example, if a vending machine which sold only products A, B and C during a fill period realized a total of $100 in profit, $45 of which was generated through the sale of product A, $40 through product B and $15 through product C, then the products would be sorted in the order of A (45% of the total profit), B (40% of the total profit) and C (15% of the total profit). Further, in some embodiments, only those products that remain in inventory (i.e. are available for sale) at the time when Step 100 is executed are considered in the ranking or sorting, and thus, in the subsequent allocation procedure of Step 200, which defines one or more inventory groups.

Step 200: Determine Allocation of Products to Inventory Groups Based on Value Rating Determination and Stored Rules.

The value rating associated with each product may be used in assigning products to inventory groups.

In one embodiment, an inventory group may define a given number of component product "slots", or a designated number of products that may be allocated to that inventory group. In other words, an inventory group is defined in part according to how many products the inventory group should include.

For example, a vending machine may be configured to have two inventory groups, such as "green" group and "red" group, in which the red group has three component product slots and the green group has six component product slots. Thus a customer might be offered to select one component product from the three red slots (i.e. select one product from three possible products) and one component from the six green slots (i.e. select one product from six possible products). The slots of a group may be "filled" according to value ratings of products. For example, the five products having the highest profit contribution factors may be allocated to the "green" inventory group, and the six with the lowest profit contribution factors may be allocated to the "red" inventory group. As described above, two or more groups may include the same product, and no group may include certain products. Thus, where a green group includes five products and a red group includes six products, there may be eleven products available for sale, or more or less than eleven.

In another embodiment, a predetermined percentage of the products (or of only the products which are available for sale) may be allocated to each group so that, for example, 50% of the products will be allocated to the "red" group and the remaining 50% of products will be allocated to the "green" group. In particular, it can be advantageous to allocate similar products to a group. For example, the top 50% (by value rating) of products are allocated to one group, and the remaining products are allocated to another group.

In another embodiment, all products having a value rating over a certain threshold (e.g. over $0.25) may be placed in a particular inventory group (e.g. in the "red" inventory group).

Each inventory group may be associated with a rule (e.g., a stored value rating-based allocation rule) defining the products that are allocated to the inventory group. For example, in an embodiment where three component product slots are "red" and six component product slots are "green", a profitability-based allocation rule may provide that (1) the three inventoried products having the highest value ratings are to be allocated to the "red" inventory group, and (2) the six inventoried products having the lowest value ratings are to be allocated to the "green" inventory group. Thus, continuing with the ongoing example, Lay's® Potato Chips, Diet Coke® and Coca-Cola® would be allocated to the red inventory group; and A&W Root Beer®, Doritos®, Cheetos®, Double-Mint®, Juicy Fruit® and Dentyne® would be allocated to the green inventory group. Accordingly, a package offer may provide that a customer may purchase one product from the red group and one product from the green group for $1.00.

In an alternate embodiment, rather than having a fixed number of inventory slots or a percentage-based division of products among inventory groups, the number of slots in each inventory group may be determined randomly and/or pursuant to a genetic algorithm, whereby a given slot configuration is tested randomly and evaluated against other configurations.

Further, a set of package offer rules may also be employed in determining how to allocate products to different inventory groups. An exemplary Package Offer Rules Database is represented by the Table immediately below:

TABLE 5

Package Offer Rules Database

| Package Offer Rule Number | Rule |
| --- | --- |
| 1 | Products from "beverage" category cannot be in same inventory grouping as products from "chewing gum" category. |
| 2 | Total margin of package instance based on $1.00 package price cannot be equal to or less than 50% of the sum of the individual component products' margins. |
| 3 | Do not allocate to inventory groups those products selling at ≧110% of target sales rate. |
| 4 | Cheetos ® must be both in red and green inventory groups |

Although rules may be represented as being stored in a database for reference, such rules may be implemented in an wide variety of manners, such as (i) "hard coded" into software and/or hardware, and (ii) coded in software/hardware with reference to parameters which are stored in a database or other memory structure.

As illustrated, a database may provide one or more rules that govern the allocation of products to inventory groups, whether or not with reference to the value ratings of the products. The exemplary data in the above database of Table 5 depicts several rules. For example, as demonstrated by Package Offer Rule Number 1, a package offer rule may provide that products from certain categories may or may not be packaged with products from other categories. Such a rule may be desirable to ensure that only certain combinations of products are offered and/or so that certain combinations of products are not offered. For example, it may be decided (e.g. by an operator) that certain products complement each other, as may a beverage and a snack. Conversely, it may be decided (e.g. by an operator) that certain products should not be included in a package offer (e.g., as in Package Offer Rule Number 1, "beverages" cannot be included in package offers with "chewing gum"). Products that are affected by such rules (e.g., whether a product is a "beverage") can be determined by appropriate notation or data stored in an inventory database. For example, all products that are "beverages" can be indicated as such by a flag in the corresponding record of the product. Alternatively, the rule which refers to beverages can in fact directly refer to a specific plurality of products (e.g., each identified by a respective product code).

Further, as demonstrated by Package Offer Rule Number 2, a package offer rule may provide that the total margin of a package instance, based on a given package price, cannot be equal to or less than a certain percent of the sum of the individual component product's margins (based on their respective individual retail prices).

Similarly, a package offer rule may provide that the total margin of a package instance, based on a given package price, cannot be less than the margin that would result from a sale of the individual products at their retail prices, unless a threshold volume of sales (e.g., as measured by units sold, or units sold per time period) for one or more of the component products is likely to be achieved. Such a rule may be desirable to ensure that any discounts offered by way of package offers are sufficiently offset by an increase in sales volume. For example, by requiring that a certain package instance have a certain historic acceptance rate, operators can rest assured that a discount offered for the products by virtue of a package price that is less than the sum of the component products' individual retail prices will not likely result in a decrease in profits.

Further still, a package offer rule may provide that products selling above or below a given actual sales rate may or may not be included in certain inventory groups (or in any inventory group). For example, Package Offer Rule Number 3 illustrates a rule that provides that a product having an actual sales rate above a certain threshold is not to be included in inventory groups (e.g., t any inventory group which might be used in a package offer). Such a rule can be useful in preventing price dilution that may otherwise result when very popular products are sold on promotion through package offers. As is known, price dilution generally involves the negative effect on profitability that can ensue when a product is sold for a price lower than a customer otherwise would have paid for the product.

Some embodiments can reduce or eliminate the effects of dilution that may otherwise result when package prices are less than the sum of the individual component products' retail prices. In other words, because very popular products are highly likely to sell at their current retail prices, it may be decided (e.g., by an operator) that very popular products should not ever be sold at a discount, even for purposes of promoting the sale of additional (relatively less popular) products through package offers. Alternatively, it may be desirable to package together only products having actual sales rates above a certain threshold with products having actual sales rates below a certain threshold. In this manner, an operator may attempt to leverage the popularity of a given product to sell additional, relatively less popular products.

Further still, an inventory group may be defined to include a particular set of products based on a what product the customers first selects (e.g. if product A1 is selected, then the second inventory group is defined to include products B1, B2 and B3).

Moreover, a rule may provide that particular products are to be included in some, all or no inventory groups. For example, Package Offer Rule Number 4, above, illustrates an example rule that requires Cheetos® to be included in both green and red inventory groups, regardless of value rating.

Thus, continuing with the ongoing example, the table immediately below illustrates the effect of Package Offer Rules 1, 3 and 4 on the inventory group allocations:

TABLE 6

Effect of Package Offer Rules

| Product | Product Category | Retail Price | Margin | Actual Sales Rate as percent of ideal sales rate | Preliminary Inventory Grouping (i.e. before application of Package Offer Rules) | Inventory Grouping after considering Package Offer Rules | Relevant Package Offer Rule (from Package Offer Rule Database) |
|---|---|---|---|---|---|---|---|
| Lay's® Potato Chips | Snack | $.75 | $.45 | 113% | Red | None | 3 |
| Diet Coke® | Beverage | $.75 | $.45 | 107% | Red | Red | N/a |
| Coca-Cola® | Beverage | $.75 | $.40 | 92% | Red | Red | N/a |
| A&W® Root Beer | Beverage | $.65 | $.30 | 85% | Green | None | 1 |
| Doritos® | Snack | $.50 | $.20 | 88% | Green | Red | N/a |
| Cheetos® | Snack | $.60 | $.30 | 50% | Green | Green, Red | 4 |
| Double-Mint® | Chewing Gum | $.35 | $.15 | 85% | Green | Green | N/a |
| Juicy Fruit® | Chewing Gum | $.35 | $.15 | 65% | Green | Green | N/a |
| Dentyne® | Chewing Gum | $.40 | $.20 | 42% | Green | Green | N/a |

As shown, Package Offer Rule 3, which functions to prevent packaging of products which have sales rates greater or equal to 110% of their target sales rates, precludes the inclusion in any package offer of Lay's® potato chips, which has an actual sales rate of 113% of its target sales rate. Further, pursuant to Package Offer Rule 4, Cheetos® are allocated to both the red and green inventory groups, despite the initial value rating-based allocation of Cheetos® solely to the green inventory group. Additionally, considering Package Offer Rule 1, A&W Root Beer®, a beverage, cannot be included in the green inventory grouping because chewing gum products preliminarily exist in the green inventory grouping as a result of the above-illustrated allocation based on value rating.

Thus, without yet considering Package Offer Rule 2, the possible combinations of component products (i.e. the package instances) are illustrated in the table immediately below:

TABLE 7

Possible Combinations

| Product 1 | Product 2 |
|---|---|
| Diet Coke ® | Cheetos ® |
| Diet Coke ® | Double-Mint ® |
| Diet Coke ® | Juicy Fruit ® |
| Diet Coke ® | Dentyne ® |
| Coca-Cola ® | Cheetos ® |
| Coca-Cola ® | Double-Mint ® |
| Coca-Cola ® | Juicy Fruit ® |
| Coca-Cola ® | Dentyne ® |
| Doritos ® | Cheetos ® |
| Doritos ® | Double-Mint ® |
| Doritos ® | Juicy Fruit ® |
| Doritos ® | Dentyne ® |
| Cheetos ® | Cheetos ® |
| Cheetos ® | Double-Mint ® |
| Cheetos ® | Juicy Fruit ® |
| Cheetos ® | Dentyne ® |

However, considering Package Offer Rule 2, which provides that the total margin of a package instance based on a $1.00 package price cannot be equal to or less than 50% of the sum of the individual component product's margins, it becomes apparent that the package instance where Coca-Cola® and Cheetos® are purchased together for the package price of $1.00 violates Package Offer Rule 2. The table immediately below shows, for each potential instance in the ongoing example, whether or not that package instance violates Package Offer Rule 2:

TABLE 8

Violation of Package Offer Rule 2

| Product 1 | Product 1 Retail Price | Product 1 Cost | Product 1 Margin at Retail Price | Product 2 | Product 2 Retail Price | Product 2 Cost | Product 2 Margin at Retail Price | Total Margin of Package Instance at $1.00 Package Price (i.e. $1.00 − (Cost Product 1 + Cost Product 2) | Sum of Product 1 Margin at Retail Price + Product 2 Margin at Retail Price | Violates Package Offer Rule 2? |
|---|---|---|---|---|---|---|---|---|---|---|
| Diet Coke ® | $.75 | $.30 | $.45 | Cheetos ® | $.60 | $.30 | $.30 | $.40 | $.75 | No |
| Diet Coke ® | $.75 | $.30 | $.45 | Double-Mint ® | $.35 | $.20 | $.15 | $.50 | $.60 | No |
| Diet Coke ® | $.75 | $.30 | $.45 | Juicy Fruit ® | $.35 | $.20 | $.15 | $.50 | $.60 | No |
| Diet Coke ® | $.75 | $.30 | $.45 | Dentyne ® | $.40 | $.20 | $.20 | $.50 | $.65 | No |
| Coca-Cola ® | $.75 | $.35 | $.40 | Cheetos ® | $.60 | $.30 | $.30 | $.35 | $.70 | Yes |
| Coca-Cola ® | $.75 | $.35 | $.40 | Double-Mint ® | $.35 | $.20 | $.15 | $.45 | $.55 | No |
| Coca-Cola ® | $.75 | $.35 | $.40 | Juicy Fruit ® | $.35 | $.20 | $.15 | $.45 | $.55 | No |
| Coca-Cola ® | $.75 | $.35 | $.40 | Dentyne ® | $.40 | $.20 | $.20 | $.45 | $.60 | No |
| Doritos ® | $.50 | $.30 | $.20 | Cheetos ® | $.60 | $.30 | $.30 | $.40 | $.50 | No |
| Doritos ® | $.50 | $.30 | $.20 | Double-Mint ® | $.35 | $.20 | $.15 | $.50 | $.35 | No |
| Doritos ® | $.50 | $.30 | $.20 | Juicy Fruit ® | $.35 | $.20 | $.15 | $.50 | $.35 | No |
| Doritos ® | $.50 | $.30 | $.20 | Dentyne ® | $.40 | $.20 | $.20 | $.50 | $.40 | No |
| Cheetos ® | $.60 | $.30 | $.30 | Cheetos ® | $.60 | $.30 | $.30 | $.40 | $.60 | No |
| Cheetos ® | $.60 | $.30 | $.30 | Double-Mint ® | $.35 | $.20 | $.15 | $.50 | $.45 | No |
| Cheetos ® | $.60 | $.30 | $.30 | Juicy Fruit ® | $.35 | $.20 | $.15 | $.50 | $.45 | No |
| Cheetos ® | $.60 | $.30 | $.30 | Dentyne ® | $.40 | $.20 | $.20 | $.50 | $.50 | No |

As shown in the above example, the package instance including Coca-Cola® and Cheetos® is impermissible according to Package Offer Rule 2. Thus, the vending control system may make an adjustment to the inventory group allocations so that Coca-Cola® is not offered with Cheetos®. Because, in this example, Rule 4 provides that Cheetos® must be included in both the green and red inventory groups, Coca-Cola® may be removed from the red inventory group so that Coca-Cola® cannot be selected by a customer along with Cheetos®, a green inventory product, pursuant to a package offer. Thus, in this ongoing example, Coca-Cola® would not be assigned to either inventory group. Accordingly, Coca-Cola® would not be included in an offer that is defined solely by inventory groups, and thus could not be selected by a customer as a component product pursuant to such a package offer.

Thus, after preliminarily allocating the inventoried products in the ongoing example to red and/or green inventory groups based on their relative value ratings and then considering all the package offer rules in the exemplary Package Offer Rules Database, the possible package instances, and the component products' inventory groupings in each instance, are shown in the table immediately below:

TABLE 9

Package Instances

| Product 1 | Inventory Grouping | Product 2 | Inventory Grouping |
| --- | --- | --- | --- |
| Diet Coke ® | Red | Cheetos ® | Green |
| Diet Coke ® | Red | Double-Mint ® | Green |
| Diet Coke ® | Red | Juicy Fruit ® | Green |
| Diet Coke ® | Red | Dentyne ® | Green |
| Doritos ® | Red | Cheetos ® | Green |
| Doritos ® | Red | Double-Mint ® | Green |
| Doritos ® | Red | Juicy Fruit ® | Green |
| Doritos ® | Red | Dentyne ® | Green |
| Cheetos ® | Red or Green | Cheetos ® | Green or Red |
| Cheetos ® | Red | Double-Mint ® | Green |
| Cheetos ® | Red | Juicy Fruit ® | Green |
| Cheetos ® | Red | Dentyne ® | Green |

Step 300: Output Package Offer.

According to the described embodiment, after the inventoried products have been allocated to the inventory group(s), the vending machine may output a package offer to customers via one or more output devices. For example, an LCD display may read "Pick one red product and one green product for $1.00!", and LED displays located proximately to several products may illuminate or flash in red and/or green as determined by the inventory groups. Following the ongoing E Cheetos®, Double-Mint® and Juicy Fruit®.

Many methods are contemplated for communicating offers via output devices. For example, in one embodiment, package offers may be communicated entirely through an LCD display (e.g. through digital icons representing the qualifying products). Alternatively, in another embodiment, a package offer may be communicated through a combination of static displays (e.g. painted or printed signage reading "Pick one red product and one green product for $1.00") and LED displays located proximately to qualifying component products (e.g. LEDs next to qualifying products may flash in red and/or green as appropriate).

Step 400: Process Transaction in Accordance with Package Offer.

After a package offer is output to a customer, a customer may accept such a package offer. Accordingly, at Step 400, the vending machine may receive, through an input device, an indication of a customer's acceptance of a package offer. Such an indication may comprise the receipt of payment (e.g., currency, a payment identifier such as a credit card number) through payment processing mechanisms such as coin acceptors, bill validators and/or card readers.

In embodiments where a customer has prepaid for products, the "receipt of payment" for the offered products may comprise a command by the customer to redeem prepaid credit, units or the like. For example, the customer could enter, via a touch screen, a code which uniquely identifies his previous prepayment for a certain number of products (e.g., five units of any product, six units of any beverage). Additionally or alternatively, the prepayment could be evidenced by a magnetic strip card or bar code which is read by a peripheral of the vending machine.

Alternatively or additionally, an indication of acceptance of the offer may comprise a signal, received through an input device such as a keypad or touch screen, indicating that the customer desires to purchase a combination of products pursuant to a package offer (e.g., clicking a "YES" button on a touch screen).

In accordance with Step 400, a customer selects at least one product from each of at least two inventory groups. Thus, a customer may select a product from a first inventory group by inputting, into a keypad or touch screen, an indication of a product that the first inventory group includes (e.g., a "red" product). Following the ongoing example, a customer may select from the red inventory group either Diet Coke®, Doritos®, or Cheetos® by inputting into a keypad his or her selection of Row Position Identifier A2, B1 or B3, respectively. After the customer selects a first product from the first inventory group, the customer may be instructed to and the customer may indeed select a second product from a second inventory group. Following the ongoing example, a customer may select, from the green inventory group, Dentyne®, Cheetos®, Double-Mint® or Juicy Fruit® by inputting into a keypad his or her selection of Row Position Identifier C3, B3, C1 or C2, respectively.

In some embodiments, a default time for selecting the second product is provided such that if the customer does not select a second product from the second inventory group within the default time, the vending machine may (1) consummate the transaction as if the first selected product was purchased at its retail price by dispensing a unit of the product and providing change, if appropriate; (2) prompt the customer with a reminder message via an output device; or (3) automatically identify and dispense, as the second component product, a unit of a "default" product that the second inventory group includes (e.g. a stored rule may provide that the product in the second inventory group having the highest retail profit margin is automatically dispensed).

In some embodiments, if the customer does not select an appropriate second product but rather selects an inappropriate product (e.g. selects a product that is not allocated to the second inventory group), then the vending machine may output, through an output device, an error message prompting the customer to select a product from the appropriate (second) inventory group.

At Step 400 the vending machine may also process payment in a conventional manner such as by (i) detecting an amount that is deposited/rendered/provided, comparing that amount to a (package) price, and dispensing change due if appropriate, or (ii) requesting a credit authorization from a remote computer, such as a computer operated by a credit card transaction processing company (e.g. First Data Corp.).

Payment may have been previously rendered (e.g., $5 was previously paid for the right to purchase five pairs of products in the future). If so, and if the products pursuant to such prepayment are being redeemed in the transaction, many well known processes may be employed to debit the prepaid account for the redeemed products.

Further, at Step 400, depending on which products were selected by the customer, the vending machine control system may, in a manner known in the art, transmit one or more signals to a product dispensing apparatus to dispense the at least two products. In one embodiment, dispensing signals are sent to corresponding product dispensing actuators/motors after the customer selects all component products. In another embodiment, such dispensing signals are sent to corresponding product actuators/motors substantially immediately after each component product is selected, so that products are made available immediately following selection.

Step 500: Record Results in Database.

At Step 500, the vending machine records results of the transaction in a database or similar memory structure. Step 500 may include the step of (1) updating one or more inventory records in an inventory database to reflect the vending of products (i.e. the quantity available of products sold is decreased to account for sales of units of the products), and/or (2) updating an acceptance or sales rate associated with a product or products to reflect the sale of a product or products (e.g., recording the units sold, the time of the sale and/or the date of the sale). Following the ongoing example, assuming that a customer on Jun. 25, 2003 purchased, for a $1.00 package price, one can of Diet Coke® and one package of Double-Mint® gum, then the above inventory database would be updated to reflect that five units of Diet Coke® and seventeen units of Double-Mint® gum remain in inventory and available for sale. Likewise, the actual sales rates of Diet Coke® would be updated from 1.2/day to 1.3/day; the actual sales rate of Double-Mint® gum would be updated from 2.2/day to 2.3/day. Thus, through the package promotion, Diet Coke® would have reached its ideal sales rate of 1.3/day, and the actual sales rate of Double-Mint® gum would have moved significantly closer to its ideal sales rate of 2.6/day.

Updating inventory amounts and sales rate data advantageously provides the vending machine with updated market data (e.g., supply and demand data) that can be fruitfully exploited in subsequent executions of the processes of various embodiments. In other words, such updated inventory amounts and sales rates can be referenced subsequently by the vending machine control system in subsequently making definitions of inventory group (see Steps 100 and 200, supra).

REACTIVE INVENTORY GROUPING EMBODIMENTS

In "reactive inventory grouping" embodiments, a customer is offered the ability to purchase a combination of products for a single price by selecting a first product from a first group of inventoried products, and then picking a second product from a second inventory group which is revealed to the customer only after the first product is selected.

Such an embodiment can be desirable because it can provide customers with an entertaining way of interacting with a vending machine. In other words, because in this embodiment the second inventory group is not revealed to the customer until a first product is selected, customers may experience feelings of hopeful anticipation until such a second inventory group is revealed. This feeling may be analogous to the excitement and exhilaration some customers receive when gambling or playing a chance-based game.

Thus, in some embodiments, game-themed messages may be output through the one or more output devices prior to the revealing of the second inventory group, thereby incorporating a game-like feel into the customer's experience with the vending machine. In other words, in some reactive inventory grouping embodiments, output devices may be configured to output game-themed animations, such as spinning slot machine reels, roulette wheels, or the like, before a second inventory group is revealed to the customer. Accordingly, such machines can present customers with the appearance that a (randomly determined) resolution or outcome of a game determines the products which the second inventory group includes. In this manner, the second inventory group may be presented as a "prize showcase" from which customers may select a prize.

Further, in some embodiments, reactive inventory grouping may be less computationally intensive or otherwise require less computing resources than, e.g., certain types of proactive inventory grouping, and accordingly can be more desirable to some vending machine operators (particularly in certain hardware environments).

Figure 3:
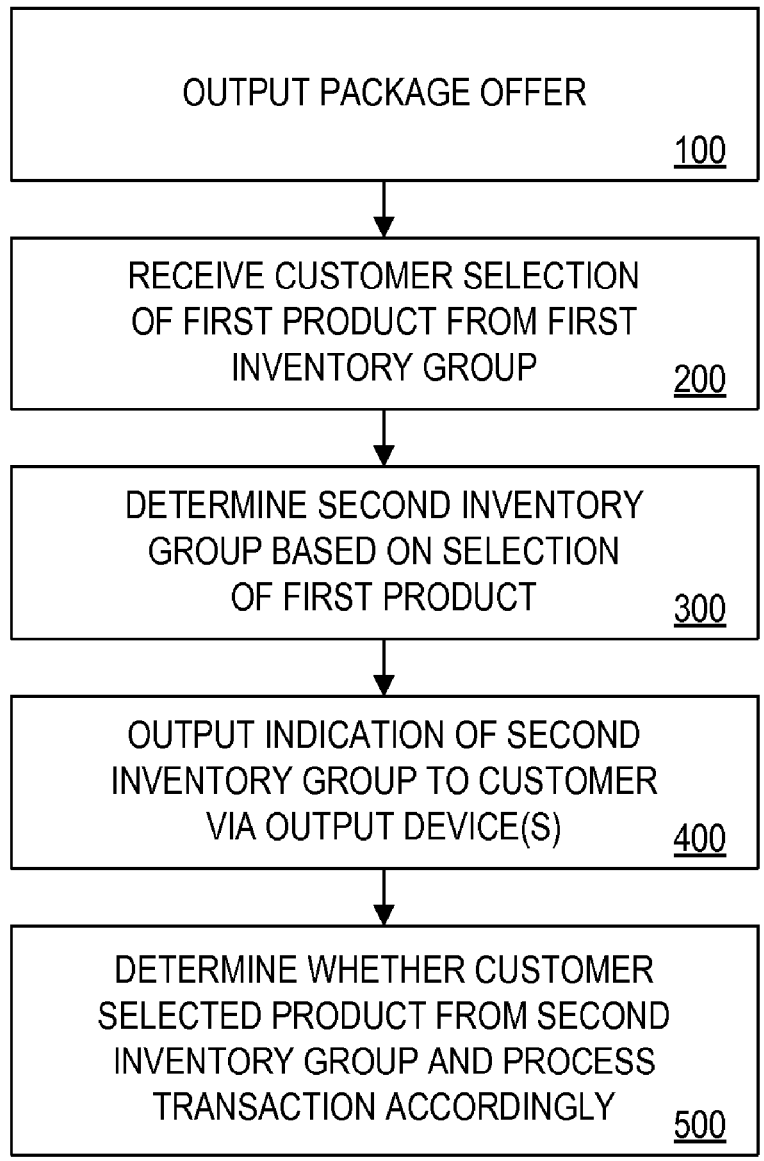
FIG. 3 illustrates an embodiment of a reactive inventory grouping embodiment.

A description of FIG. 3, which provides a flow chart illustrating a reactive inventory grouping process, follows. Of course, steps performed in a reactive inventory grouping embodiment does not imply that those steps may only be performed in a reactive inventory grouping embodiment.

Step 100: Output Package Offer.

At Step 100, the vending machine outputs a package offer to the customer regarding the availability of a package deal. For example, an LCD display may output a message reading "Pick 2 items for $1. Pick any item, and then a group of items will flash. Pick any flashing item as your second item." Alternatively, such a message may be provided through a static means (e.g. painted or printed signage).

Step 200: Receive Customer Selection of First Product from First Inventory Group.

At Step 200, the vending machine control system receives, via one or more input devices, a signal indicating a customer's selection of a first product, and that product is determined to be included in a first inventory group. In some embodiments, this step may be accompanied or preceded by payment processing steps, including the receipt of currency.

According to some embodiments, the selection of a product by a customer may be determined to not be included in the requisite inventory group. If so, then subsequent steps of the instant process might not be performed.

According to one embodiment, the first inventory group may comprise all inventoried products. Thus, according to such an embodiment, a customer may select any product in inventory as the first product. Thus the product selected might make no difference as to which products are included in the second inventory group.

However, according to another embodiment, the first inventory group may not include all products. In one embodiment, such a subset may be predetermined (e.g. defined by an operator and/or stored in a memory accessible to the vending machine control system). In another embodiment, the first inventory group may be determined (e.g., determined dynamically) to include products according to sale and/or cost data (and possibly stored rules or other logic mechanisms). Thus, for example, stored rules may provide that only those products selling at or less than a particular actual sales rate are to be included in the first inventory group. In this manner, the vending machine may be programmed to promote certain products in package promotions (e.g., upon selection of a product which is not selling as well as desired).

Step 300: Determine Second Inventory Group Based on Selection of First Product.

At Step 300, the vending machine defines a second inventory group based the customer's selection of a first product. In some embodiments, the vending machine employs one or more rules (e.g., stored package offer rules) to determine which products are potentially eligible to be included in the second inventory group based on the first product (which was selected by the customer). For example, a package offer rule may provide that products from competing manufacturers cannot be purchased together pursuant to a package offer. Accordingly, the second inventory group would not include products which are manufactured by competitors of the manufacturer of the first, selected product. Alternatively or additionally, another package offer rule may provide that the second inventory group includes only products from categories that are "complementary" to the category of the first product. For example, if a customer were to select a beverage as his first product, the vending machine second group may only include products from the snack and gum categories.

Further, a package offer rule may provide that, if the first selected product's actual sales rate is above a certain threshold, only products selling at or less than a predetermined actual sales rate are to be included in the second inventory group. In this manner, vending machines according to various embodiments may exploit the popularity of a well-selling product to promote the sale of (relatively) less popular products.

Conversely, a package offer rule may provide that, if the first selected product's actual sales rate is below a certain threshold, only products selling above a predetermined actual sales rate are to be included in the second inventory group. In this manner, vending machines according to various embodiments may prompt customers to choose a less popular product in the hopes of a good deal on a more popular product, with an element of chance involved.

Alternatively or additionally, a value rating of each possible second product may be considered, as described above. For example, the vending machine control system may determine the value rating of one or more products and determine, based on stored rules, that only the five products having the highest value ratings may be included in the second inventory group. As in the case of the above-described proactive inventory grouping embodiments, the value rating of each possible second product may be determined, e.g., based on: (1) the product's margin, and/or (2) the product's margin multiplied by its actual sales rate expressed as a percentage of its ideal sales rate.

In an embodiment, the second inventory group may determined before the customer selects the first product, but the second inventory group is only revealed to the customer after the first product is selected.

In an embodiment, a plurality of second inventory groups may be determined. Thus, selection of a product included in any of the second inventory groups would be acceptable. Depending on which of the second groups the second selected products is included in, different actions may be taken (e.g., awarding bonus products or credits, providing entertaining displays or sounds). Thus an entertaining set of interactions can result from differentiating between acceptable second selections.

Step 400: Output Indication of Second Inventory Group to Customer Via Output Device(s).

After the second inventory group is determined, an indication of the products included in the second inventory group is output at Step 400 to the customer via one or more output devices. For example, LEDs located proximately to the products may illuminate or flash. Alternatively or additionally, an LCD may output graphical icons representing the qualifying products included in the second inventory group.

Step 500: Determine Whether Customer Selected Second Product from Second Inventory Group and Process Transaction Accordingly.

At Step 500, it is determined whether the customer selected the second product from the second inventory group. If the customer has selected a second product from the second inventory group by, for example, transmitting a signal to the vending machine processor via an input device such as a keypad, then the vending machine processor may actuate product dispensing apparatus to dispense units of the first and second selected products. (Alternatively, the vending machine control system may dispense a unit of the first product upon its selection at Step 200, and dispense a unit of the second product at Step 500 once it has been determined that the customer has selected a product from the second inventory group.)

In some embodiments, this step may be accompanied by payment processing steps, such as the receipt of payment and the dispensing of appropriate change (e.g. based on the difference between any payment tendered and the package price). It should be noted that such an embodiment would allow customers to select first products before depositing any currency, and then see which products are available as second products before committing to purchase any products whatsoever. In this manner, any anxiety caused to customers by virtue of the uncertain composition of the second inventory group can be reduced or eliminated.

In some embodiments, if the customer has selected a product that is not included within the second inventory group, the vending machine control system may output, through an output device, an error message. For example, an LCD may output a message that reads "Sorry, but the item you have selected is not eligible for the package deal. Please select a flashing item to continue or press "no thanks" to purchase your first selection at its retail price."

In some embodiments, the vending machine control system may be configured to monitor the time starting, e.g., with a customer's initial selection of a first product. If the customer does not select a second product within a predetermined period of time, the vending machine may be configured to, e.g., consummate a transaction for the first product at its retail price, thereby assuming that the customer does not wish to select a second product from the second inventory group and accept a package offer.

Alternatively, at the end of such a predetermined period of time, the vending machine may automatically select and dispense a second product (e.g., a second product selected according to stored rules), and thereby complete a transaction at a package price. For example, stored rules may provide that the product in the second inventory group with the highest/lowest margin is automatically dispensed if no second product is selected within the predetermined period of time. Alternatively, stored rules may provide that the most/least popular product in the second inventory group (e.g. as indicated by its actual sales rate) is automatically dispensed if no second product is selected within the predetermined period of time.

If any products are dispensed at Step 500 (or earlier in the process, according to some embodiments), the vending machine may, as described above, record results of the transaction in a database or similar memory structure (e.g., update inventory records).

MISCELLANEOUS ALTERNATE AND ADDITIONAL EMBODIMENTS

Alternate Proactive Inventory Grouping Embodiment—Expected Profitability of Possible "Allocations" Considered In another proactive inventory grouping embodiment, products are allocated to inventory groups based on the expected or predicted profitability of each possible "inventory allocation". In other words, unlike the previously-described embodiments in which there are a predetermined or fixed number of product "slots" in each inventory group (e.g., per a stored rule), this embodiment allocates products to inventory groups by evaluating the expected profitability of each possible allocation of products (e.g., to at least two inventory groups).

For example, in a vending machine configured to sell four products (e.g. products A, B, C and D) in package deals from two inventory groups (e.g. red and green), in which all products are allocated to exactly one inventory group and an inventory group must contain at least one product, there are fourteen possible inventory allocations, as illustrated by the table immediately below:

TABLE 10

Allocations

| Allocation | Products in Red Group | Products in Green Group |
| --- | --- | --- |
| 1 | A | B, C, D |
| 2 | A, B | C, D |
| 3 | A, C | B, D |
| 4 | A, D | B, C |
| 5 | A, B, C | D |
| 6 | A, B, D | C |
| 7 | A, C, D | B |
| 8 | B | A, C, D |
| 9 | B, C | A, D |
| 10 | B, D | A, C |
| 11 | B, C, D | A |
| 12 | C | A, B, D |
| 13 | C, D | A, B |
| 14 | D | A, B, C |

As stated, the expected profitability of each possible allocation would be determined. Then, the vending machine control system would select the possible allocation with the highest expected profitability, and communicate a package offer accordingly. For example, if it was determined that Allocation 14 (in which product D is in the red inventory group and products A, B and C are in the green inventory group) is expected to be the most profitable, the vending machine may flash LEDs proximately located to each of the corresponding products in the appropriate colors to indicate that allocation of products to the two inventory groups.

There are many ways that the expected profitability of an allocation may be determined. According to one embodiment, the expected profitability of a given allocation may be determined by summing the expected profitabilities of each possible combination instance within that particular allocation. Thus, in the allocation in which product D is in the red inventory group and products A, B and C are in the green inventory group, the expected profitability for the instances "D with A", "D with B", and "D with C" would be individually determined and then added together to determine the total expected profitability of the allocation.

To determine the expected profitability of each instance within a given allocation, a variety of techniques may be employed. According to one embodiment, the expected profitability of a given instance is determined by multiplying the probability that the instance will be accepted within a given period (e.g. within 24 hours) by the margin of the package instance (e.g. the package price less the cost of the component products). In such an embodiment, the probability that a given instance will be selected may be determined based on a stored, received or calculated "acceptance rate" for the instance.

MULTIPLE PACKAGE OFFERS IN PROACTIVE INVENTORY GROUPING EMBODIMENTS

In some proactive inventory grouping embodiments, vending machines may be configured to simultaneously (or substantially simultaneously) output a plurality of package offers. Thus, after inventory groups are defined, the vending machine may output package offers that apply to the inventory groups. For example, for particular inventory groups, an offer may provide customers with the ability to choose which of the following to purchase:

(a) two products for a first inventory group for a first package price (e.g. two products from the "green" inventory group for $1.50), (b) one product from a first inventory group and one product from a second inventory group for a second package price (e.g. one product from the green inventory group and one product from the red inventory group for $1.25), or (c) two products from a second inventory group for a third package price (e.g. two products from the red inventory group for $1.00).

Any number of offers may be output simultaneously or substantially simultaneously.

In an embodiment, offers are not output simultaneously, but are instead triggered by an event. For example, a single offer may be output after a customer provides payment (e.g., inserts currency). If the customer does not select any product within a certain amount of time (e.g., within 20 seconds of inserting currency, within 20 seconds of the offer being provided) then additional offers may be provided. In such an embodiment, the initial offer may be the most profitable but possibly less desirable to the typical customer (e.g., a relatively high package price, high margin component products), and subsequent offers are less profitable, but more desirable to the customer (e.g., a relatively low package price, low margin component products)

In an embodiment, different sets of offers may be output at different times, according to various desirable factors described herein.

Alternative/Additional Ways to Present Package Offers

Many alternate or additional methods or formats for communicating package offers are contemplated.

In a proactive inventory grouping embodiment, a list of specific package instances could be output to customers via an output device, rather than (or in addition to) indicating the inventory grouping status of different products. For example, rather than merely outputting an offer that instructs prospective customers to select any "red" and any "green" product for $1, a vending machine may also group certain package instances of "red" and "green" products and communicate the instances via an LCD display. Following the ongoing example from the above description of proactive inventory grouping embodiments (in which Diet Coke®, Doritos®, and Cheetos® were allocated to the red inventory group and Dentyne®, Cheetos®, Double-Mint® and Juicy Fruit® were allocated to the green inventory group), an LCD may output an offer visually representing a grouping of Diet Coke® with Dentyne®. Thus, rather than communicating all possible instances, only a certain number of instances may be shown through an LCD display (e.g. those with the highest or lowest historic acceptance rates). Further, package instances may be communicated through similarly colored LEDs. For example, a particular package instance comprising Diet Coke® and Dentyne® may be communicated by illuminating purple LEDs next to both Diet Coke® and Dentyne®, indicating that the products together comprise a single package instance.

In a proactive or reactive inventory grouping embodiment, customers may be offered the ability to purchase, for a package price, any combination of products whose retail prices total a certain sum. For example, customers may be offered the ability to purchase, for a $1 package price, any two products having a combined retail price of $1.30. Similarly, customers may be offered the ability to purchase any product having a first retail price (e.g. $0.85) and any product having a second retail price (e.g. $0.25) for a single package price (e.g. $1.00).

Further, in a proactive or reactive inventory grouping embodiment, certain (but not necessarily all) products that an inventory group includes may be given a visual preference (e.g. some red LEDs may flash at faster intervals than other red LEDs; some red LEDs may be illuminated brighter than other red LEDs, etc.). Thus, particular products included in an inventory group may be promoted over other products in the same inventory group. For example, products in an inventory group having a higher value rating may be indicated by brighter LED displays than products in that inventory group having a lower value rating. Alternatively, products that are selling at sales rates below a certain threshold may be indicated by brighter LED displays than products that are selling at sales rates above the threshold. This embodiment would help draw greater customer attention to products that are selling relatively poorly.

In yet another alternate embodiment, inventory groups are not dynamically determined (e.g., as in proactive or reactive inventory grouping embodiments), but are rather determined according to stored rules that govern which products may together comprise packages and which may not. For example, in an embodiment, a vending machine may be configured to allow a customer to pick three products for $1.00, provided that no two products are from the same shelf (row) of the vending machine. Thus, package offers may be communicated with fixed signs or other advertising on or around the shelves or the vending machine. In such embodiments, upon selection of a first product, a vending machine may prevent the selection and dispensing of certain products (e.g. products from the same shelf, row or category) as second products. Alternatively, a warning or other indication may be provided to the customer, and the customer allowed to select another product.

Cross-Machine Promotions

As stated, various embodiments can be configured to work in conjunction with two or more vending machines. Thus, according to some embodiments, pursuant to a package offer, customers may purchase two or more products for a single price, and may select and/or retrieve products from two or more vending machines.

Thus, a customer may view the inventory of two machines (which may be proximately-located), and may accept an offer output from a first machine or output from a peripheral device. The peripheral device may be stand-alone or integrated with one or more of the vending machines. The peripheral may communicate with one or more of the vending machines in nay of a number of well-known manners.

The vending machine or peripheral device may output a code, password, PIN, receipt or other substantially-unique identifier to the customer. This identifier may be redeemed at a participating vending machine, allowing the customer to retrieve products from one or more of the participating machines.

For example, after allocating inventoried products to at least two inventory groups spanning at least two machines using the above-disclosed methods, a first vending machine may output an offer reading "2 for $1! Select any flashing item from this machine AND any flashing item from the adjoining machine for $1." LEDs located proximately to the qualifying products may flash. A customer may then, after seeing the flashing products, decide to accept the package offer and deposit $1 into the first machine. The customer may then select a first product from the first vending machine, and the first vending machine may then output a (substantially-unique) bar code on a piece of paper (e.g., printed by an on-board printer, preprinted stock dispensed by a dispensing device). The customer could then be instructed, through the first vending machine's output device, to insert the piece of paper into a reader (e.g., ticket reader, bill acceptor, card reader, bar code reader) which is attached to or in communication with the second machine when the customer is ready to select his second product. Upon presenting the piece of paper (e.g., into the card reader), the second vending machine's processor would validate the code by querying either a local database (e.g., of previously agreed-upon codes) or a remote database (e.g., created and stored by the first machine). The second vending machine could then present to the customer the same inventory group as originally advertised at the time of the offer. Thus, the customer may return to select his second product at a later time (even after the second vending machines inventory has been reallocated to new inventory groupings), and the second vending machine could revert back to or recall the previous inventory grouping in effect at the time of the offer. This would allow the customer to select from the options that were originally presented to him (e.g. the products that were previously flashing in red are returned to red status upon presentment of the bar code identifier).

An apparatus and method for processing the sale of two products from two vending machines for a single price is disclosed with reference to U.S. Pat. No. 6,059,142 (to Wittern, Jr. et al.), the entirety of which is incorporated herein for all purposes.

Display of Retail Prices

In an embodiment, retail prices are not automatically communicated by output devices to customers. Instead, a customer must affirmatively inquire as to the retail price of a particular product. In this manner, customers are encouraged to accept package offers, which are actively promoted by the vending machine's output devices. However, in other embodiments, the retail prices of the individual products may be communicated contemporaneously with the presentation of package offers.

In an embodiment, customers may be permitted or required to select between various modes, such as "retail" and "package" modes, before transacting with the vending machine. That is, before selecting and purchasing any products, a customer may press a button on a touch screen or otherwise indicate whether the customer would like to (1) purchase a package (e.g., two products for $1.00), or (2) purchase one product for that product's retail price.

Opt Out of Inventory Groups for a Premium

In an embodiment, customers may be offered the option to pay a premium so that they can purchase two or more products from the same inventory group, rather than one from each. For example, a message on a vending machine's touch screen might read: Want two red items? Add $0.25." In essence, such an embodiment would give the customer the ability to buy themselves out of the predefined inventory groups and would thereby ensure that customers are given more choice.

Periodic Random Allocation of Products to Inventory Groups

In an embodiment, one or more random products are allocated to inventory groups (periodically, after each transaction, at random times). This embodiment would tend to keep the inventory groups new and exciting for vending machines with many repeat customers (e.g., vending machines in office buildings). In such an environment, customers may tend to purchase the same products repeatedly. This embodiment thus may positively influence repetitive inventory grouping/allocation patterns.

Customers Offered Choice Between One or Two Products; Confirmation Screens

In an embodiment, vending machine transactions are limited to a certain price, and customers are given a choice between one higher price product, and two or more products from two or more inventory groups. For example, transactions may be limited to purchases of $1.25 and for $1.25 customers may purchase either (1) one (large) bottle of soda, or (2) two (small) cans of soda. Further, in an embodiment, vending machines may be configured to output "confirmation screens" in response to a customer's selection so that a customer must confirm her selection through an input device (e.g. a button) before such selections are accepted and the transactions are consummated.

Value-Back "Bonuses"

In an embodiment, customers who select two (or more) products as part of a given single-price package offer (e.g. two products for $5) may be offered a "bonus" (e.g. a third product) upon certain conditions (e.g., if certain rules are satisfied). Thus, in some embodiments, when customers select two (or more) products that together represent more than a threshold amount of realizable profit for the machine, such customers are offered a bonus that may be valued at an amount equal to, less than, or greater than the amount of additional realizable profit beyond the threshold amount. For example, if a customer selects two products from an inventory group typically associated with high-margin products, the machine may "give value back" to the customer in the form of a bonus, in order to bolster the goodwill with the customer and hopefully spur future transactions with the customer and favorable recommendations by the customer. Such an embodiment would work particularly well in situations in which a customer selects two products that having retail prices that, when aggregated, are less than the single package price. Thus, the vending machine would not take advantage of the customer's failure to realize the markup.

Bonuses may take many forms, including: (1) printed vouchers or tickets entitling customers to discounts (e.g. for the amount that surpasses the threshold amount) or free products from one or more vending machines in the future; (2) instant cash rebates (e.g. for the amount that surpasses the threshold amount; such amounts may be dispensed through change dispensing apparatus), and (3) extra product(s) (e.g. products which are valued at approximately the amount that surpasses the threshold amount) from the same vending machine or other vending machines.

In an embodiment, where appropriate (e.g., where one or more rules are satisfied, are not satisfied), bonuses may be selected by the customer. For example, the vending machine may output a message to the customer indicating that the customer may "select any additional 'red' flashing product", and the customer's selection of a red product causes a unit of the red product to be dispensed. Further, a time limit may be imposed so that if the customer does not so select an appropriate product within a threshold amount of time (e.g. two minutes after the offer is presented), the vending machine may automatically issue a cash rebate, or provide no bonus.

In an embodiment, where appropriate (e.g., where one or more rules are satisfied, are not satisfied), bonuses may be communicated to customers through game-themed content or interface. For example, utilizing a "Price is Right®" game theme, customers may be given the opportunity to "spin" a "value wheel" for a bonus product by pressing a button on a touch screen. Once the customer has pressed the button, a wheel icon may be displayed as spinning on the touch screen, ultimately stopping on an indication of a bonus to be awarded (e.g. a particular product). Many other game themes are contemplated, including "Wheel of Fortune®".

Subset of Inventory Considered in Allocation Process; "Rounded" Allocations

In an embodiment, the vending machine may only consider products placed in a single "column" or "shelf" of the vending machine when determining how to allocate products to inventory groups. For example, in a snack machine embodiment in which a vending machine has several shelves, products may happen to align in several columns. For example, a machine having four shelves, each capable of storing five products (i.e. ten helixes per shelf in a double helix snack machine), would have five columns. The operator may program the machine so that products stocked in the two rightmost columns are to be allocated to the "red" group, and that products stocked in the two leftmost columns are to be allocated to the "green" group. Thus, in such an embodiment, the vending machine would only determine (e.g., dynamically) how to allocate the inventory stocked in the center column to the different inventory groups (green and red).

The vending machine may determine, for example, that three of the five products in the center column are to be allocated to the "red" inventory group. In such embodiments, the vending machine may be further configured to allocate all products in the column to the group that dominates the column. That is, in this example, all products in the center column would be allocated to the red inventory group because a majority (three of the five) products in the center column were initially allocated to the red group. Such a "rounded allocation" may be desirable in some markets, as it would provide a convenient, user-friendly way to communicate inventory groupings to customers. That is, in such an embodiment, customers may easily see that all products on the right of the machine are "red", while all products on the left of the machine are "green".

Transaction Status Messages/Screens

In an embodiment in which customers are permitted to choose two or more products for a single price, one or more output devices may be configured to communicate the status of a transaction to a customer. For example, after a customer selects a first product, an indication of the first product may be communicated to the customer via an output device (e.g. an icon of the selected first product may appear on an LCD display). Further, instructions regarding the selection of a second product may be communicated through such output devices. That is, after a customer has selected a first product from a first inventory group, a message may be output to the customer instructing the customer to select a second product from a second inventory group. For example, after selecting a product from a first inventory group (e.g. a product on a first shelf; a product indicated by a "green" flashing light), the customer may be instructed to pick a product from a second inventory group (e.g. a product on a second shelf; a product indicated by a "red" flashing light).

Package Offer Row

In an embodiment, a vending machine may be configured dispense two (or more) products from a particular row or other particular location for a single price. Thus, a row of a vending machine may be designated as a "package offer" row, and the vending machine may be configured to consecutively dispense, from such a row, units of two (or more) products upon tender of a package price and selection of a corresponding row identifier (e.g. "A1" may correspond to a package offer row which provides two units of Snickers® candy bars for $1.00). Further, such "package offer" rows may be configured to prevent the dispensing of single units of product for retail prices (i.e. such rows may be exclusively used for package offers).

A package offer row may be stocked with alternating types of products. For example, a Snickers® candy bar may be followed by a Milky Way® candy bar, which is followed by a Snickers® candy bar, and so on. Thus, purchasing from such a package offer row can allow diverse combinations of products (e.g., "A2" may correspond to a package offer row which provides one unit of Snickers® candy bar and one unit of Milky Way® candy bar for $1.00).

In such embodiments, a vending machine may be configured to dispense two (or more) products from a first row for a single price, while dispensing only one product from a second row for a single price. Alternatively, every row in a vending machine may be configured as a "package offer" row.

We claim:

1. A method, comprising:
    defining, automatically by a vending machine, and based on stored sales data and stored rules, a first inventory group and a second inventory group;
    outputting, by the vending machine, a first indication of a first subset of products sold by the vending machine that are part of the first inventory group, wherein the outputting of the first indication comprises selectively illuminating a first set of LED devices, and wherein each LED device of the first set of LED devices is coupled proximately to at least one product of the first subset of products;
    outputting, by the vending machine, a second indication of a second subset of products sold by the vending machine that are part of the second inventory group, wherein the outputting of the second indication comprises selectively illuminating a second set of LED devices, and wherein each LED device of the second set of LED devices is coupled proximately to at least one product of the second subset of products;
    outputting, by the vending machine, an offer for a customer to purchase a first product from the first subset of products and a second product from the second subset of products for a single package price;
    receiving an indication, by the vending machine and from the customer, of a selection of the first product;
    receiving an indication, by the vending machine and from the customer, of a selection of the second product;
    determining, by the vending machine, an indication of a payment, by the customer, of the single package price; and
    dispensing, by the vending machine and in response to the receiving of the indication of the payment of the single package price by the customer, a unit of the first product and a unit of the second product.

2. The method of claim 1, wherein the single package price comprises an amount that is less than a sum of a first retail price of the first product and a second retail price of the second product.

3. The method of claim 1, wherein the single package price comprises one dollar.

4. The method of claim 1, wherein each LED device of the first set of LED devices is operable to illuminate a green color and wherein each LED device of the second set of LED devices is operable to illuminate a red color.

5. The method of claim 1, wherein the receiving, by the vending machine, of the indication of the payment, by the customer, of the single package price, comprises:
    receiving an indication that the customer desires to redeem an amount of pre-paid credits stored in an account associated with the customer.

6. The method of claim 1, wherein the single package price comprises a number of generic product units and wherein the receiving, by the vending machine, of the indication of the payment, by the customer, of the single package price, comprises:
    receiving an indication that the customer desires to redeem an amount of generic product units stored in an account associated with the customer.

7. The method of claim 1, wherein the first inventory group is defined by being populated with the top fifty-percent of products sold by the vending machine based on profit contribution factor.

8. The method of claim 1, wherein the second inventory group is defined by being populated with the bottom fifty-percent of products sold by the vending machine based on profit contribution factor.

9. The method of claim 1, wherein the first inventory group is defined by being populated with a predetermined number of the top products sold by the vending machine based on value rating.

10. The method of claim 1, wherein the second inventory group is defined by being populated with a predetermined number of the bottom products sold by the vending machine based on value rating.

11. The method of claim 1, wherein the single package price comprises one dollar and a quarter.

12. The method of claim 1, wherein the single package price comprises one dollar and a half.

13. The method of claim 1, wherein the defining is conducted between fill periods of the vending machine.

14. A vending machine, comprising:
a processor; and
a storage device in communication with the processor and storing instructions adapted to be executed by the processor to:
- define, automatically and based on a random allocation of products sold by the vending machine, a first inventory group and a second inventory group;
- output a first indication of a first subset of products sold by the vending machine that are part of the first inventory group, wherein an outputting of the first indication comprises selectively illuminating a first set of LED devices, and wherein each LED device of the first set of LED devices is coupled proximately to at least one product of the first subset of products;
- output a second indication of a second subset of products sold by the vending machine that are part of the second inventory group, wherein an outputting of the second indication comprises selectively illuminating a second set of LED devices, and wherein each LED device of the second set of LED devices is coupled proximately to at least one product of the second subset of products;
- output an offer for a customer to purchase a first product from the first subset of products and a second product from the second subset of products for a single package price;
- receive an indication, from the customer, of a selection of the first product;
- receive an indication, from the customer, of a selection of the second product;
- determine an indication of a payment, by the customer, of the single package price; and
- dispense in response to a receiving of the indication of the payment of the single package price by the customer, a unit of the first product and a unit of the second product.

15. The vending machine of claim 14, wherein the stored instructions are adapted to be executed by the processor to perform the outputting of the first indication, the outputting of the second indication, the outputting of the offer, the determining of the single package price, and the dispensing of the units of the products, by a retrofit device coupled to the vending machine.

16. A medium storing instructions adapted to be executed by a processor to cause a vending machine to:
- define, automatically and based on stored sales data and stored rules, a first inventory group and a second inventory group;
- output a first indication of a first subset of products sold by the vending machine that are part of the first inventory group, wherein an outputting of the first indication comprises selectively illuminating a first set of LED devices, and wherein each LED device of the first set of LED devices is coupled proximately to at least one product of the first subset of products;
- output a second indication of a second subset of products sold by the vending machine that are part of the second inventory group, wherein an outputting of the second indication comprises selectively illuminating a second set of LED devices, and wherein each LED device of the second set of LED devices is coupled proximately to at least one product of the second subset of products;
- output an offer for a customer to purchase a first product from the first subset of products and a second product from the second subset of products for a single package price;
- receive an indication, from the customer, of a selection of the first product;
- receive an indication, from the customer, of a selection of the second product;
- determine an indication of a payment, by the customer, of the single package price; and
- dispense, in response to a receiving of the indication of the payment of the single package price by the customer, a unit of the first product and a unit of the second product.

17. The medium of claim 16, wherein the defining is conducted between fill periods of the vending machine.

* * * * *

UNITED STATES PATENT AND TRADEMARK OFFICE
CERTIFICATE OF CORRECTION

| | | |
|---|---|---|
| PATENT NO. | : 7,865,265 B2 | |
| APPLICATION NO. | : 11/877182 | |
| DATED | : January 4, 2011 | |
| INVENTOR(S) | : Walker et al. | |

It is certified that error appears in the above-identified patent and that said Letters Patent is hereby corrected as shown below:

Replace Column 29, Line 43, Immediately following the heading "Step 300: Output package offer" with the following REPLACEMENT PARAGRAPH:

According to the described embodiment, after the inventoried products have been allocated to the Inventory group(s), the vending machine may output a package offer to customers via one or more output devices. For example, an LCD display may read "Pick one red product and one green product for $1.00!", and LED displays located proximately to several products may Illuminate or flash in red and/or green as determined by the inventory groups. Following the ongoing example, the LED displays located proximately to the following products would flash in red: Diet Coke®, Doritos®, and Cheetos®. Additionally, the LED displays located proximately to the following products would flash in green: Dentyne®, Cheetos®, Double-Mint® and Juicy Fruit®.

Signed and Sealed this
Twenty-sixth Day of June, 2012

David J. Kappos
*Director of the United States Patent and Trademark Office*